US010482672B2

(12) United States Patent
Namgoong et al.

(10) Patent No.: US 10,482,672 B2
(45) Date of Patent: Nov. 19, 2019

(54) ELECTRONIC DEVICE AND METHOD FOR TRANSMITTING AND RECEIVING IMAGE DATA IN ELECTRONIC DEVICE

(71) Applicant: Samsung Electronics Co., Ltd., Gyeonggi-do (KR)

(72) Inventors: Bo-Ram Namgoong, Gyeonggi-do (KR); Ja Min Goo, Gyeonggi-do (KR); Ji Hyun Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/886,989

(22) Filed: Feb. 2, 2018

(65) Prior Publication Data
US 2018/0232955 A1    Aug. 16, 2018

(30) Foreign Application Priority Data
Feb. 15, 2017    (KR) .................. 10-2017-0020765

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC .. G06T 19/006; H04N 13/117; H04N 13/344; H04N 13/366; H04N 21/234345;
(Continued)

(56) References Cited

U.S. PATENT DOCUMENTS 8,184,069 B1 *    5/2012    Rhodes ............... G02B 27/017
345/8
2010/0290674 A1    11/2010    Kim
(Continued)

FOREIGN PATENT DOCUMENTS

JP    2016-527536 A    9/2016
KR    10-2011-0093664 A    8/2011
(Continued)

OTHER PUBLICATIONS

European Search Report dated Jun. 19, 2018.

*Primary Examiner* — Jennifer Mehmood
*Assistant Examiner* — Ngan T Pham Lu
(74) *Attorney, Agent, or Firm* — Cha & Reiter, LLC.

(57) ABSTRACT

An electronic device and method are disclosed herein. The electronic device includes a communication circuit, a memory and a processor. The processor implements the method including: receiving first data of a first quality, and second data of a second quality, the second quality different from the first quality, controlling a display device to display the first data and the second data, the first data corresponding to a first field of view of a user, transmitting information indicating a second field of view of the user through the communication circuit to the external electronic device, receiving third data of the second quality corresponding to the first field of view and fourth data of the first quality corresponding to the second field of view from the external electronic device, and controlling the display device to display the fourth data corresponding to the second field of view of the user.

19 Claims, 20 Drawing Sheets

(51) Int. Cl.

| | | |
|---|---|---|
| *G02B 27/01* | (2006.01) | |
| *H04N 21/2343* | (2011.01) | |
| *H04N 13/117* | (2018.01) | |
| *H04N 21/414* | (2011.01) | |
| *H04N 21/422* | (2011.01) | |
| *H04N 21/4728* | (2011.01) | |
| *H04N 21/6587* | (2011.01) | |
| *H04N 21/81* | (2011.01) | |
| *H04N 13/344* | (2018.01) | |
| *H04N 13/366* | (2018.01) | |

(52) U.S. Cl.
CPC ............ *G06F 3/012* (2013.01); *H04N 13/117* (2018.05); *H04N 13/344* (2018.05); *H04N 13/366* (2018.05); *H04N 21/23439* (2013.01); *H04N 21/234345* (2013.01); *H04N 21/414* (2013.01); *H04N 21/42202* (2013.01); *H04N 21/4728* (2013.01); *H04N 21/6587* (2013.01); *H04N 21/816* (2013.01); *G02B 2027/0123* (2013.01)

(58) Field of Classification Search
CPC ........... H04N 21/23439; H04N 21/414; H04N 21/42202; H04N 21/4728; H04N 21/6587; H04N 21/816; G02B 27/017; G06F 3/011; G06F 3/012
USPC .......................................................... 345/8
See application file for complete search history.

(56) References Cited

U.S. PATENT DOCUMENTS

| | | |
|---|---|---|
| 2011/0201362 A1 | 8/2011 | Bregman-Amitai et al. |
| 2014/0361977 A1 | 12/2014 | Stafford et al. |
| 2016/0260196 A1* | 9/2016 | Roimela ................ G06F 3/013 |
| 2016/0267713 A1* | 9/2016 | Patel ..................... G09G 5/395 |
| 2018/0091577 A1 | 3/2018 | Park et al. |

FOREIGN PATENT DOCUMENTS

| | | |
|---|---|---|
| KR | 10-2012-0133006 A | 12/2012 |
| KR | 10-1613133 B1 | 4/2016 |
| WO | 2016/171404 A1 | 10/2016 |

* cited by examiner

ELECTRONIC DEVICE AND METHOD FOR TRANSMITTING AND RECEIVING IMAGE DATA IN ELECTRONIC DEVICE

CLAIM OF PRIORITY

This application claims the benefit under 35 U.S.C. § 119(a) of a Korean patent application filed in the Korean Intellectual Property Office on Feb. 15, 2017 and assigned Serial No. 10-2017-0020765, the entire disclosure of which is incorporated herein by reference.

TECHNICAL FIELD

Various embodiments of the present disclosure relate to electronic devices and methods for transmitting and receiving images in electronic devices.

BACKGROUND

An omni-directional or multi-directional imaging camera system is a camera system that may capture images in all or some directions with respect to a fixed view point. An omni-directional image is an image including all the views that an observer can see when he or she rotates in place and looks up or down. An omni-directional imaging camera system takes images in all directions using a camera equipped with a specific type of mirror, e.g., a hyperboloid mirror, or multiple cameras. The camera may provide captured omni-directional images to an electronic device.

The electronic device may be a wearable device, such as a head-mounted display (HMD). When the HMD is worn on the user's body part (e.g., the user's head), the HMD may output the omni-directional images received from the camera. In outputting an omni-directional image, the acceleration, angular speed, or inclined direction of the HMD may be sensed, and the image data of the view direction corresponding to the sensed information of the omni-directional image may be displayed. The HMD may change and display screens corresponding to the user's motion. Therefore, the user may enjoy a lifelike experience by viewing the changing screens.

The camera may provide an omni-directional image to the electronic device. The omni-directional image is very large in data size as because it captures image data in all directions, resulting in more data than a standard image. Thus, when the omni-directional image is sent to the electronic device, the image transmission/reception system may be overloaded, causing for example excessive consumption of local data bandwidth resources, processor load and even network load.

The above information is presented as background information only to assist with an understanding of the present disclosure. No determination has been made, and no assertion is made, as to whether any of the above might be applicable as prior art with regard to the present disclosure.

SUMMARY

According to various embodiments of the present disclosure, communication load related to an omnidirectional image may be reduced by consideration of the data that the user intends to actually view and thereby processing the image differently.

According to various embodiments of the present disclosure, the electronic device and method for processing image data may receive data corresponding to the direction of the user's view via various communication connections or by receiving various image qualities of data.

According to various embodiments of the present disclosure, an electronic device is disclosed including a communication circuit, a memory storing program instructions, and a processor electrically connected with the communication circuit and the memory, wherein the program instructions are executable by the processor to enable the processor to: receive from an external electronic device, through the communication circuit, first data of a first quality, and second data of a second quality, the second quality different from the first quality, control a display device to display the first data and the second data, the first data corresponding to a first field of view of a user, transmit information indicating a second field of view of the user through the communication circuit to the external electronic device, receive third data of the second quality corresponding to the first field of view and fourth data of the first quality corresponding to the second field of view from the external electronic device, and control the display device to display the fourth data corresponding to the second field of view of the user. According to various embodiments of the present disclosure, an electronic device is disclosed including a communication circuit, a memory, and a processor operatively coupled to the communication circuit and the memory and configured to: transmit first data of a first quality and second data of a second quality different from the first quality through the communication circuit to an external electronic device, the first data corresponding to a first field of view of a user, receive information related to a second field of view of the user from the external electronic device, and transmit to the external electronic device, third data of the second quality of data corresponding to the first field of view and fourth data of the first quality of data corresponding to the second field of view. According to various embodiments of the present disclosure, a method in an electronic device is disclosed including: receiving from an external electronic device, through a communication circuit, first data of a first quality, and second data of a second quality, the second quality different from the first quality, controlling a display device to display the first data and the second data, the first data corresponding to a first field of view of a user, transmitting information indicating a second field of view of the user through the communication circuit to the external electronic device, receiving third data of the second quality corresponding to the first field of view and fourth data of the first quality corresponding to the second field of view from the external electronic device, and controlling the display device to display the fourth data corresponding to the second field of view of the user. Other aspects and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1A:
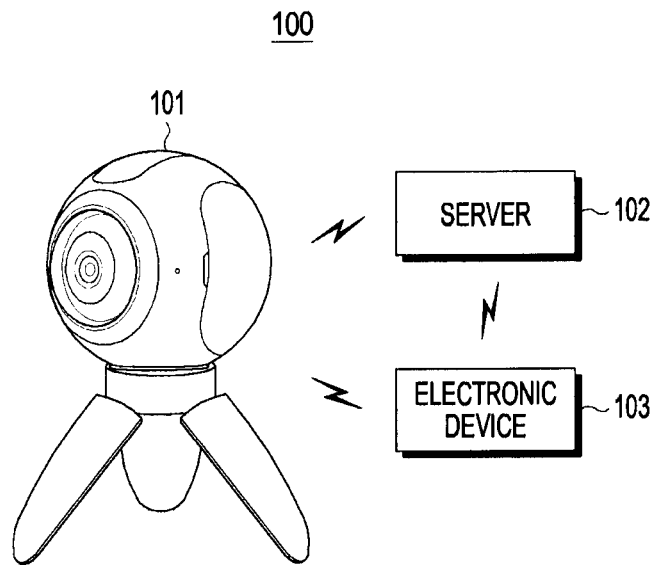
FIG. 1A and FIG. 1B is a view illustrating example electronic devices implementing an image processing system according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices.

According to an embodiment of the present disclosure, the electronic device is not limited to the above-listed embodiments. As used herein, the term "user" may denote a human or another device (e.g., an artificial intelligent electronic device) using the electronic device.

FIG. 1A is a view illustrating example electronic devices implementing an image processing system according to an embodiment of the present disclosure.

Referring to FIG. 1A, an image processing system 100 may include an image capturing device 101, a server 102, and an electronic device 103.

The image capturing device 101 may include at least one lens or camera for capturing omni-directional images. For example, the image capturing device 101 may capture a 360-degree omni-directional image with respect to a fixed position (e.g., the position of the image capturing device 101). The omni-directional image is an image including all the views that the user sees when he or she spins in place and looks up or down.

The lens of the image capturing device 101 may be a fisheye lens that may have a view angle of 180 degrees or more. For example, when the fisheye lens is positioned towards the sky, the image capturing device 101 may capture a single piece of image of an area from a constellation to the horizon. The image capturing device 101 may include a plurality of fisheye lenses to capture images in all directions.

According to an embodiment of the present disclosure, the image capturing device 101 may include a plurality of cameras with a predetermined view angle to capture images in all directions. In this case, the plurality of cameras may be provided in the image capturing device 101 to cover all directions with respect to one point. As another example, the image capturing device 101 having one or more cameras may automatically or manually be moved (e.g., in the direction of pitch, yaw, or roll) to capture images in all directions.

According to an embodiment of the present disclosure, the image capturing device 101 may include a plurality of cameras with a predetermined angle corresponding to the user's left and right eyes. For example, the image capturing device 101 may capture a stereoscopic image including multiple omni-directional images by capturing images in all directions corresponding to the user's left and right eyes.

According to an embodiment of the present disclosure, the image capturing device 101 may also capture images of some directions (e.g., a rectangular area spanning at 120 degrees from top to bottom and from left to right with respect to the lens of the image capturing device 101). The image capturing device 101 may capture an omni-directional image, process the images for some directions of the omni-directional image, and transmit to the electronic device 103.

According to an embodiment of the present disclosure, the image capturing device 101 may store the captured image and relevant metadata (e.g., direction, range, area, and position of image capturing). The metadata may include information about the position, motion, direction, and properties (e.g., camera calibration parameters or image capturing state information) of the image capturing device 101 which is detected through a sensor (e.g., a global positioning system (GPS), wireless-fidelity (Wi-Fi) module, fingerprint sensor, gyroscope sensor, acceleration sensor, geo-magnetic sensor, or altitude sensor) included in the image capturing device 101, and the image capturing device 101 may store the metadata in association with at least one of captured images.

According to an embodiment of the present disclosure, the image capturing device 101 may store the metadata with the metadata mapped (or associated) with identification information for each frame. For example, the image capturing device 101 may store sensing information about the view at which each frame is captured along with the identification information about the frame.

According to an embodiment of the present disclosure, the image capturing device 101 may map the captured omni-directional image to a two-dimensional (2D) plane image, encode the mapped 2D plane image, and store the encoded image in the memory or transmit the encoded image to the electronic device 103. For example, the image capturing device 101 may be a virtual camera that is placed in any position in a virtual-reality space (e.g., a three-dimensional (3D) space implemented in a game) and that may be image information received in association with virtual objects in the virtual reality based on the properties (e.g., position, orientation, view angle, or range) of the virtual camera. For example, the view field of an avatar in a game may correspond to the field of view (FOV) of the virtual camera, and the object image area in the virtual reality, which is displayed therethrough, may be part of the omni-directional image.

The controlling electronic device 103 may render the image received from the image capturing device 101 with an image reproduction and processing device. For example, the electronic device 103 may receive the stream data of the mapped 2D plane image from the image capturing device 101 and decode the stream data. The electronic device 103 may perform rendering using the decoded 2D plane image and display the rendered frame.

According to an embodiment of the present disclosure, the electronic device 103 may include various electronic devices, such as a virtual reality (VR) device, such as an HMD, a smartphone, a personal computer (PC), a television (TV), a tablet PC, or other various image processing electronic devices, and the electronic device 103 may be coupled to a housing prepared to be put on the user's head. The electronic device 103 coupled with the housing may be worn on the user's head firmly regardless of the user's motion, so that the user may observe images displayed on the display of the electronic device 103 or view images received from the image capturing device 101.

According to an embodiment of the present disclosure, the image capturing device 101, the server 102, and the electronic device 103 may include cellular modules, Wi-Fi modules, bluetooth modules, zigbee modules, or other communication modules to communicate with each other.

According to an embodiment of the present disclosure, the electronic device 103 may store a 3D application (or a VR application) and a 3D graphic library. The 3D application may be an application capable of providing a user with a screen that looks real. The VR means a virtual space that may be viewed around the user (or a reference point or camera), and the VR may be one obtained by rendering, on the screen, a virtual space able to represent 360 degrees, e.g., a 360-degree omni-directional image or image content, or a 3D graphic modeling space.

Figure 1B:
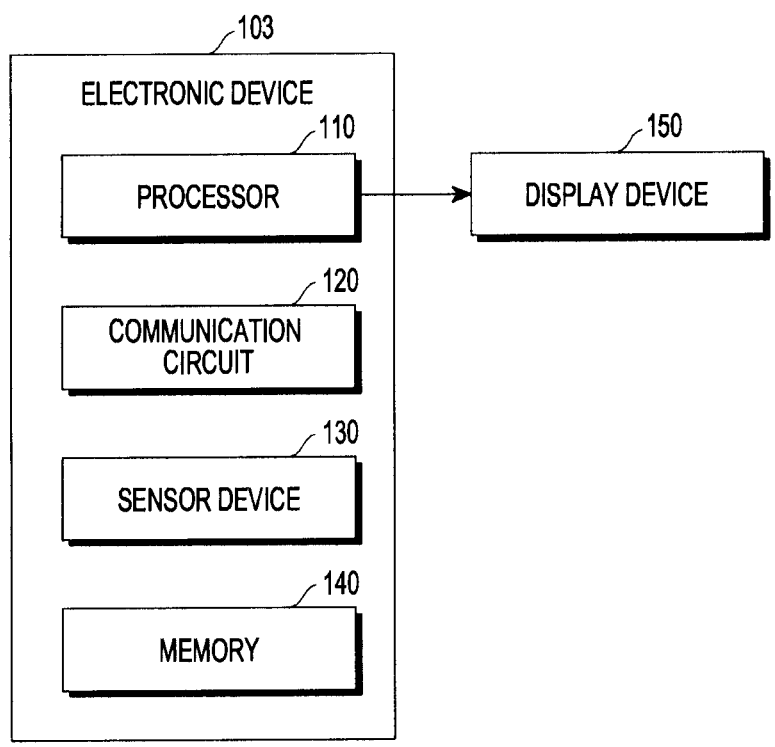

FIG. 1B is a block diagram illustrating an example of a configuration of an electronic device according to an embodiment of the present disclosure.

Referring to FIG. 1B, the electronic device 103 may include a processor 110, a communication circuit 120, a sensor device 130, and a memory 140, and the electronic device 103 may establish a communication connection with a display device 150 inside or outside the electronic device 103.

The processor 110 may perform the overall operation of the electronic device 103. The processor 110 may perform control to receive a first to third quality of data from an external electronic device (e.g., the server 102), store the data in the memory 140, and display the received data through the display 150.

According to an embodiment of the present disclosure, the processor 110 may perform control to, upon receiving an output input for an omni-directional image, display the first quality of data corresponding to a first view direction among the first to third qualities of data.

The processor 110 may transmit motion information related to a second view direction of the electronic device 103 to the server 102. As the motion information is transmitted, per-quality data corresponding to the second view direction may be received from the server 102. The first quality of data corresponding to the second view direction may include image data captured at an angle corresponding to the second view direction, and the second quality of data may include image data captured in a position rotated by a predetermined angle from the angle corresponding to the second view direction. The third quality of data corresponding to the second view direction may include image data, of the omni-directional image, captured in a direction other than the directions in which the first and second quality of data have been captured.

According to an embodiment of the present disclosure, the processor 110 may perform control to display the first quality of data through the display device 150 as the first quality of data is received within a predetermined time. In contrast, unless the first quality of data is received within the predetermined time or stored in the memory 140, the processor 110 may perform control to display the second quality of data of the image data captured in the second view direction.

The processor 110 may receive first quality of data for various view directions from the server 102. For example, the server 102 may receive sensing information from the sensor device 130, predict the motion information about the electronic device 103, and transmit the first quality of data for the various view directions including image data captured captured in a view direction at a particular view point or image data having a predetermined object captured therein.

The communication circuit 120 may receive various qualities of data corresponding to a particular view direction from an external electronic device. For example, the communication circuit 120 may be configured to communicate on multiple frequency bands and receive the first quality of data, the second quality of data, and the third quality of data through respective ones of the multiple frequency bands.

According to an embodiment of the present disclosure, the communication circuit 120 may receive the first quality of data through a first band, of the multiple frequency bands, where communication is performed at a first communication speed, receive the second quality of data through a second band, of the multiple frequency bands, where communication is performed at a second communication speed lower than the first communication speed, and receive the third quality of data through a third band, of the multiple frequency bands, where communication is performed at a third communication speed lower than the second communication speed.

The sensor device 130 may include an acceleration sensor, a gyroscope sensor, and an infrared (IR) sensor or other various sensors capable of sensing various motions of the user or the electronic device 103. For example, the acceleration sensor may sense the speed of a motion of the electronic device 103, and the gyroscope sensor may sense the angle of a motion of the electronic device 103. The IR sensor may output an IR signal, sense the reflection of the IR signal on the user's eye, and sense the user's view information.

The memory 140 may store the omni-directional image received from the image capturing device 101 or the server 102 as per-quality or per-frame data.

According to an embodiment of the present disclosure, the memory 140 may store instructions executed to enable the processor 110 to receive first data of a first quality and second data of a second quality different from the first quality from an external electronic device (e.g., the server 102), control a display device 150 to display the first data corresponding to a first view direction of the first data and the second data, transmit information related to a second view direction through the communication circuit 120 to the external electronic device, receive third data of the second quality corresponding to the first view direction and fourth data of the first quality corresponding to the second view direction from the external electronic device, and control the display device 150 to display the first quality of fourth data corresponding to the second view direction.

According to an embodiment of the present disclosure, the instructions may be configured to enable the processor 110 to control the display device 150 to display the first frame or the second frame of the omni-directional image according to a predetermined timing signal or to include the user's view information in the information related to the second view direction and transmit the information through the communication circuit 120.

According to an embodiment of the present disclosure, the instructions may be configured to enable the processor 110 to receive fifth data of the first quality corresponding to a third view direction from the external electronic device through the communication circuit 120 and to control the display device 150 to display data indicating that the fifth data is received while the fourth data is displayed or that the fifth data corresponds to the third view direction.

According to an embodiment of the present disclosure, the instructions may be configured to enable the processor 110 to receive the third data through the communication circuit 120 and a first communication connection and the fourth data through the communication circuit and a second communication connection different from the first communication connection, and when a communication speed of the first communication connection is not less than a designated value, receive the fourth data through the first communication connection.

The display device 150 may be communicably connected with the electronic device 103 and may be positioned inside or outside the electronic device 103. The display device 150 may display data rendered by the processor 110 (or a rendering unit (not shown).

According to an embodiment of the present disclosure, the instructions may be configured to enable the processor 110 to receive sixth data of the first quality having a predetermined object captured in a fourth view direction from the external electronic device and to control the display device to display data indicating that the sixth data is received while the fourth data is displayed or data indicating the fourth view direction.

According to an embodiment of the present disclosure, the instructions may be configured to enable the processor 110 to receive, from the external electronic device, seventh data of the first quality captured in a fifth view direction predicted based on motion information of the display device or the electronic device for a predetermined time.

Hereinafter, an example in which an electronic device (e.g., a smartphone) is mounted on a wearable device is described with reference to FIGS. 2A to 2C.

Figure 2A:
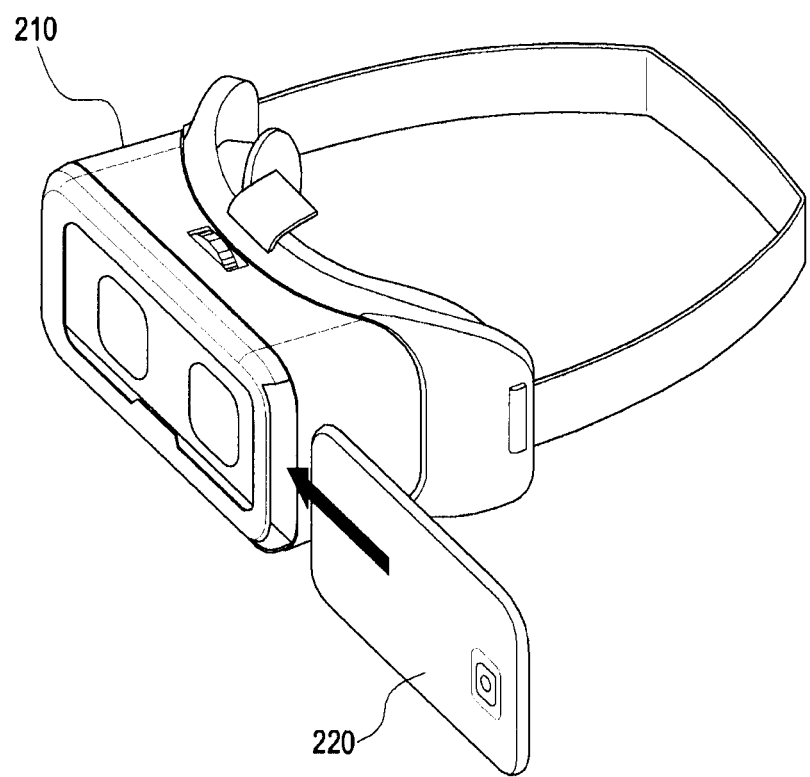
FIG. 2A and FIG. 2B are views illustrating an example of a wearable device according to an embodiment of the present disclosure.
Figure 2B:
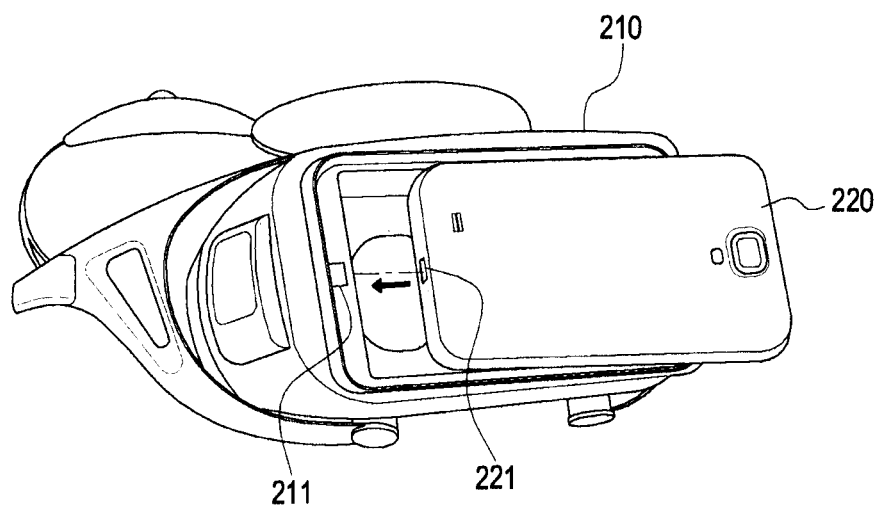

FIGS. 2A and 2B are views illustrating an example of a wearable device according to an embodiment of the present disclosure.

Figure 15:
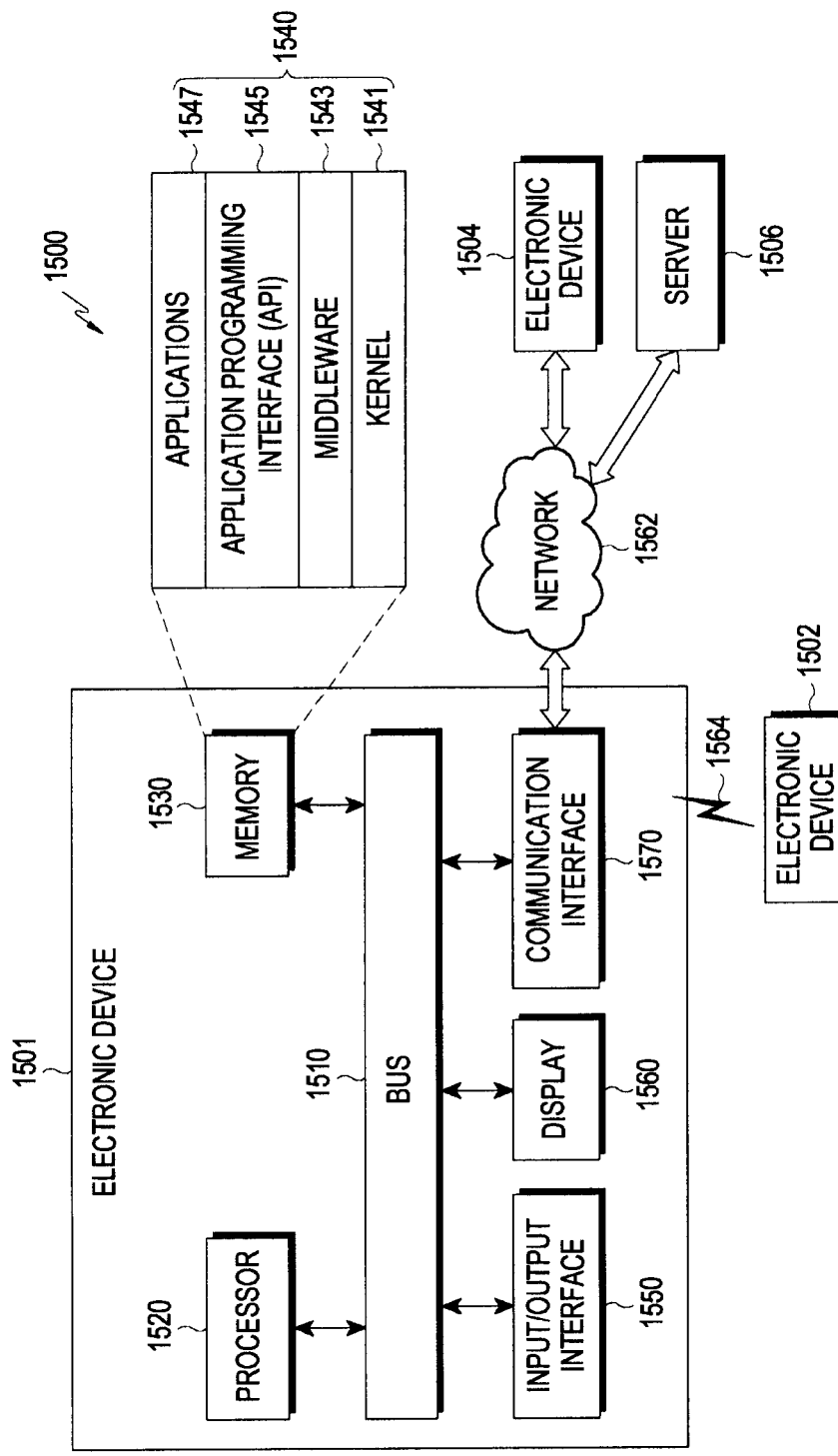
FIG. 15 is a view illustrating an example of a network environment according to an embodiment of the present disclosure.

Referring to FIGS. 2A and 2B, the wearable device 210 may be the electronic device 1502 of FIG. 15, for example. Further, as described above, the wearable device 210 may provide functions of a mount or support, and in some embodiments provide mainly the supporting and mounting function and lack any communication functionality with the electronic device 220. The wearable device 210 may include a body and a cover.

When the electronic device 220 is mounted on the wearable device 210, the cover may cover the edge of a rear surface of the electronic device 220 to be fastened to the wearable device 210 so that the electronic device 220 may remain in a mounted position. The wearable device 210 may have a support available for the user to wear the wearable device 210 on his head.

The wearable device 210 may have lenses respectively corresponding to both eyes of the user (wearer). The user may view the display (not shown) of the electronic device 220 through the lenses with the electronic device 220 mounted on the wearable device 210. The wearable device 210 may have a mechanical structure allowing the electronic device 220 to detachably be mounted thereon when coupled with the structure 221 of the electronic device 220 as shown.

According to an embodiment of the present disclosure, the wearable device 210 may include at least one of the components of the electronic device 103 shown in FIG. 1B. For example, the wearable device 210 may include at least one of a touch panel, a button, a wheel key, and a touch pad. The touch panel may receive the user's touch input. The touch input may include the user's touch on the touch panel or a hovering input near the touch panel. When the electronic device 220 is mounted, the wearable device 210 may connect with the electronic device via an interface, e.g., USB, to communicate with the electronic device 220.

The electronic device 220 may control a function corresponding to an input received from the wearable device 210 in response to the input. For example, the electronic device 220 may move or select an object displayed or control the screen (e.g., the image reproduction screen in the HMD mode) in response to the received input. For example, when the electronic device 220 is mounted on the wearable device 210, the external device connecting unit (not shown) of the electronic device 220 may be electrically connected with the connecting unit (not shown) of the wearable device 210 to enable communication between the devices.

Figure 2C:
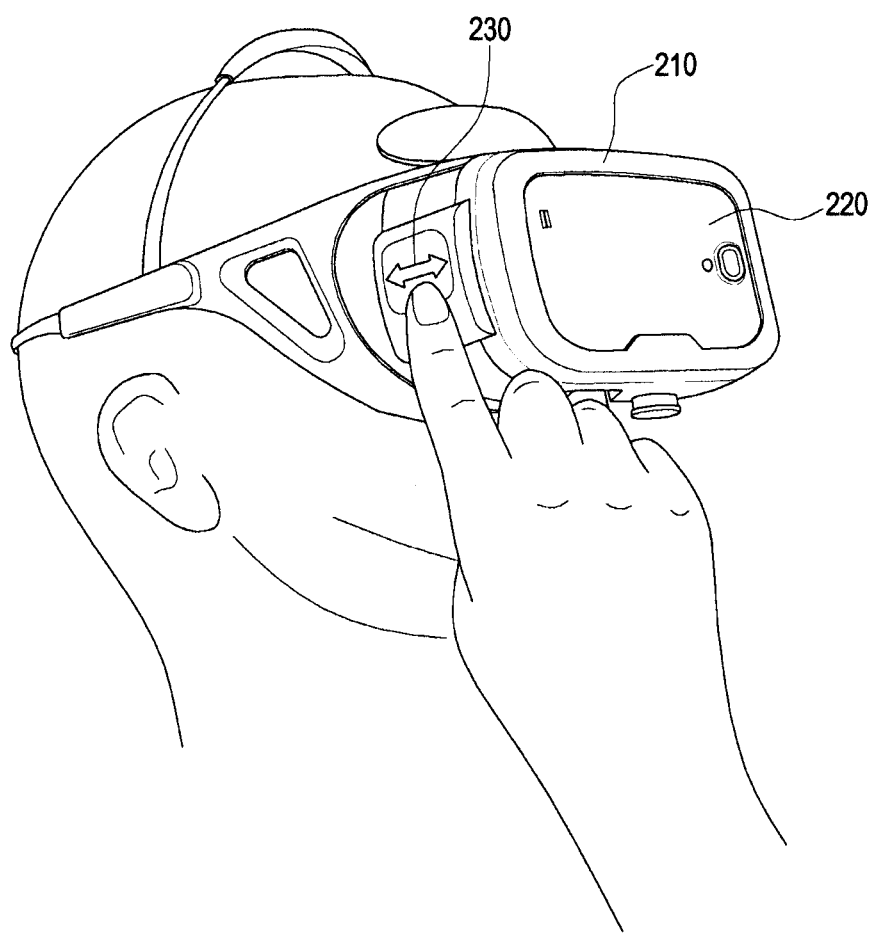
FIG. 2C is a view illustrating an example in which a user wears an electronic device-mounted wearable device according to an embodiment of the present disclosure.

FIG. 2C is a view illustrating an example in which a user wears an electronic device-mounted wearable device according to an embodiment of the present disclosure.

Further, as shown in FIG. 2C, the user may control the functions of the electronic device 220 or the functions of the wearable device 210 through a touch pad 230 provided in a side surface of the wearable device 210.

Referring to FIGS. 2A to 2C, the electronic device 220 may be the electronic device 103 of FIG. 1B, e.g., a smartphone with a display. The wearable device 210 may be the electronic device 103 or external electronic device 1302 of FIG. 1B or may be instrumental, wearable mounts.

As shown in FIGS. 2A to 2C, the electronic device 220 may be mounted on the wearable device 210 so that the display (e.g., a touchscreen) faces the user's face. The user may fasten the electronic device 220 to the wearable device 210 by closing the cover of the wearable device 210.

As shown in FIG. 2C, the user may wear the electronic device 220-mounted wearable device 210 on his head. The user may view the screen of the display of the electronic device 220 through the lenses of the wearable device 210.

Figure 3:
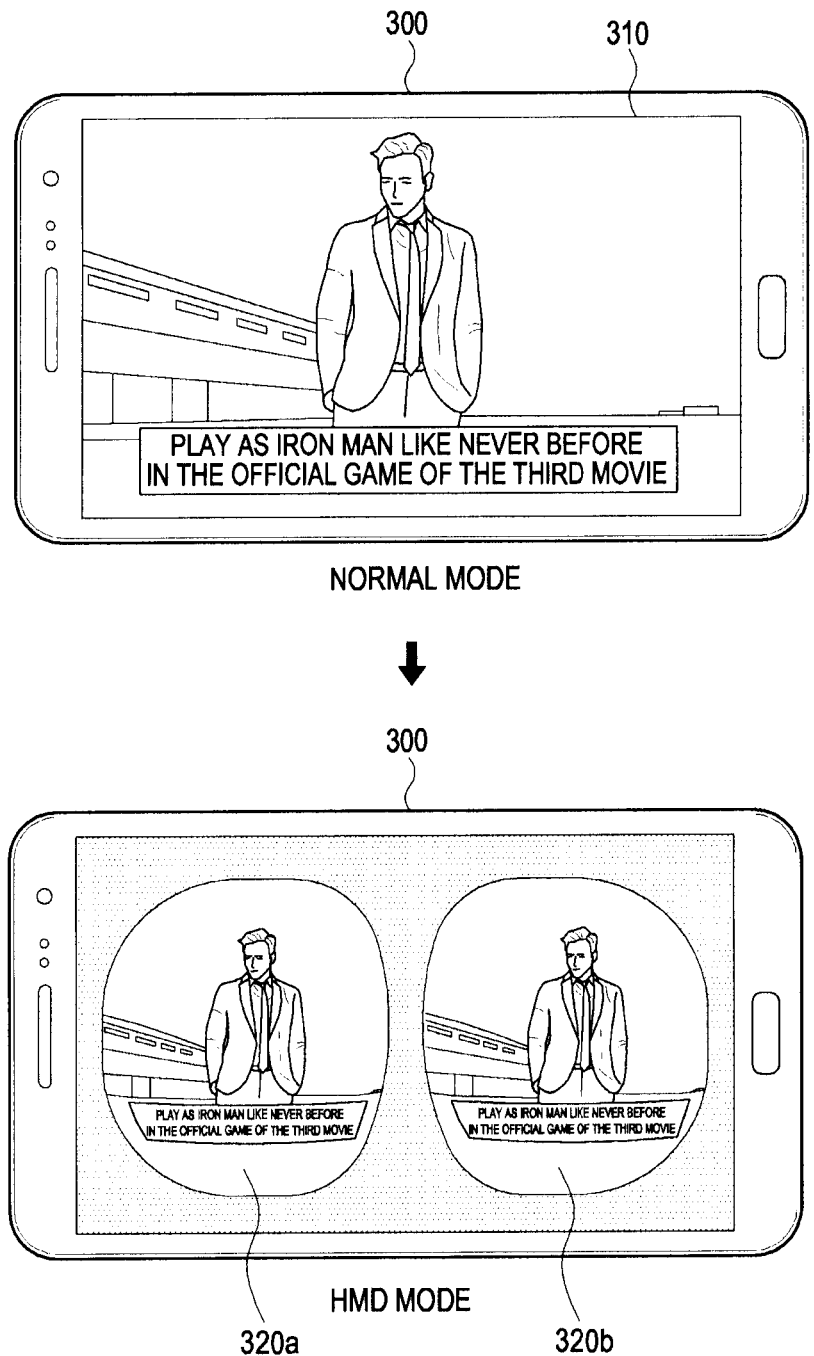
FIG. 3 is a view illustrating a screen mode of an electronic device according to an embodiment of the present disclosure.

FIG. 3 is a view illustrating a screen mode of an electronic device according to an embodiment of the present disclosure.

Referring to FIG. 3, the electronic device 300 may be the electronic device 220 of FIGS. 2A to 2C. When the electronic device 300 operates in the normal mode, it may display one operation screen 310 as shown on the upper part of FIG. 3.

According to an embodiment of the present disclosure, when the electronic device 300 is mounted on a wearable device, it may be operated in the HMD mode as shown on the lower part of FIG. 3. When the electronic device 300 is operated in the HMD mode, a screen 320a corresponding to the user's left eye and another screen 320 b corresponding to the user's right eye may be distinctively displayed. In the screen of the HMD mode, one image may be separately displayed as two images 320a and 320b.

According to an embodiment of the present disclosure, when the electronic device 300 is mounted on the wearable device and operated in the HMD mode, the display area or display position of the screen corresponding to the HMD mode (the screen 320a corresponding to the left eye and the screen 320b corresponding to the right eye) may be determined.

Figure 4:
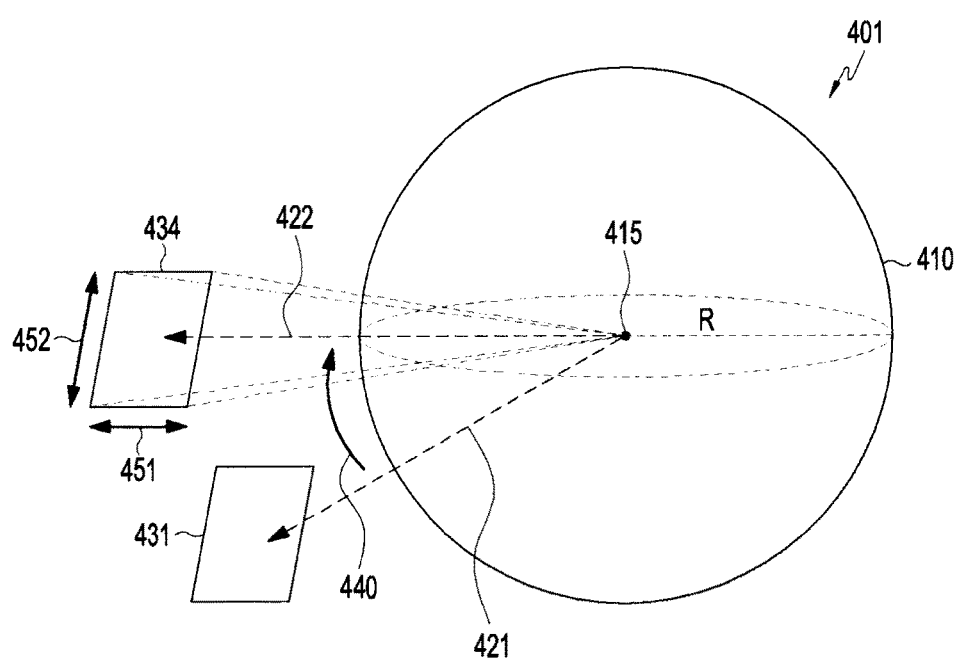
FIG. 4 is a view illustrating a 3D space according to an embodiment of the present disclosure.

FIG. 4 is a view illustrating a 3D space according to an embodiment of the present disclosure.

Referring to FIG. 4, the 3D space 401 may be implemented by at least one of an electronic device (e.g., the electronic device 103, 202, or 701), a processor of the electronic device, or a controller of the electronic device.

The 3D space 401 may be implemented by texture-mapping a wide-angle image/video to a preset 3D model 410 (e.g., a sphere having a preset radius R, a cube, or a cylinder) and positioning the user's view point (or virtual camera) within (e.g., at the starting point 415) of the 3D model.

The electronic device may render a first partial image 431 (or a first screen) corresponding to a first region of the 3D space 401 according to a first view point (e.g., a main camera view point) 421 and display the same on a display (e.g., the display 150).

According to selection of a view mode (or an input for changing view points), i.e., according to the angle 440 moved from the first view point 421 to the selected view point 422, the electronic device may render a second partial image 434 (or second screen) corresponding to a second region of the 3D space 401 and display the same on the display (e.g., the display device 150).

The camera/user's line of sight (or view direction, rendering view port or rendering region) within the 3D space 401 may be controlled by a horizontal field of view (FOV) 451 and a vertical FOV 452. The 3D application (or VR application) may set planes (e.g., right/left/top/bottom/near/far planes) limiting/defining the rendering view port, controlling the FOVs.

According to an embodiment of the present disclosure, the view point may be varied by moving the user's body part (e.g., her eye, head, torso, or hand), and the second image may be generated corresponding to the change in view point. The view point may be varied or the change in view point may be controlled by a signal received from an external device or an external user.

Figure 5:
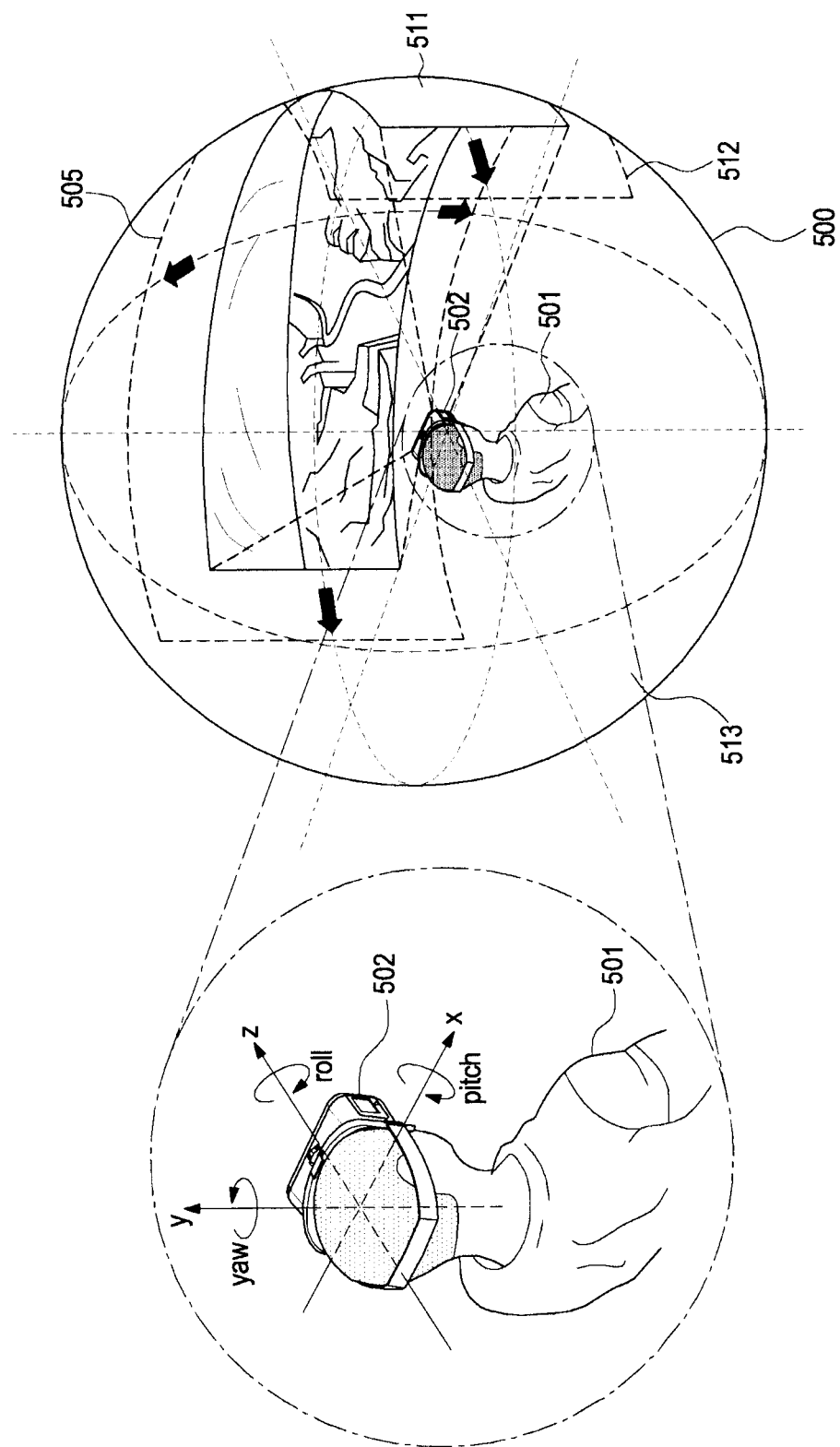
FIG. 5 is a view illustrating an example of a screen displayed on an HMD when a user wears the HMD according to an embodiment of the present disclosure.

FIG. 5 is a view illustrating an example of a screen displayed on an HMD when a user wears the HMD according to an embodiment of the present disclosure.

Referring to FIG. 5, the user 501 may place the housing of the electronic device 502 on her head. The electronic device 502 may be coupled with the electronic device 502. The user may view images displayed on the display of the electronic device 502 as the images are received from the image capturing device.

The electronic device 502 may display an image captured by the image capturing device. The captured image may be an image that the user may view as she spins at 360 degrees. The user may view a VR screen by observing the images incident on both eyes. The 3D application running on the electronic device 502 may change and display images according to the motion (yaw, pitch, or roll) of the electronic device 502 or the user 501.

According to an embodiment of the present disclosure, the display of the electronic device 502 may output a screen 511 in the HMD mode. The HMD mode screen 511 may be one in which the display screen is configured as a 3D stereoscopic image and may be a region positioned at the point corresponding to the view direction of the electronic device 502. For example, when the user 501 lets his face up, the electronic device 502 may move up accordingly, and the electronic device 502 may output a corresponding portion of a virtualized screen 505, of the HMD mode screen 511, which corresponds to an upper region with respect to the reference position.

According to an embodiment of the present disclosure, when the electronic device 502 is operated in the HMD mode, the electronic device 502 may receive first quality of first data and second quality of second data 512 corresponding to the first view direction from the external electronic device and switch to the second view direction.

According to an embodiment of the present disclosure, as the electronic device switches to the second view direction, the electronic device may transmit motion information corresponding to the second view direction to the external electronic device. In response to the transmission, the electronic device may receive, from the external electronic device, first quality of third data 511 corresponding to the second view direction and fourth data of a second quality that is different from the first quality. The electronic device 502 may display the first quality of third data 511.

Unless the first quality of third data is received within a predetermined time after switching from the first view direction to the second view direction, the electronic device 502, the electronic device 502 may display the second view direction of second data 513.

Figure 6:
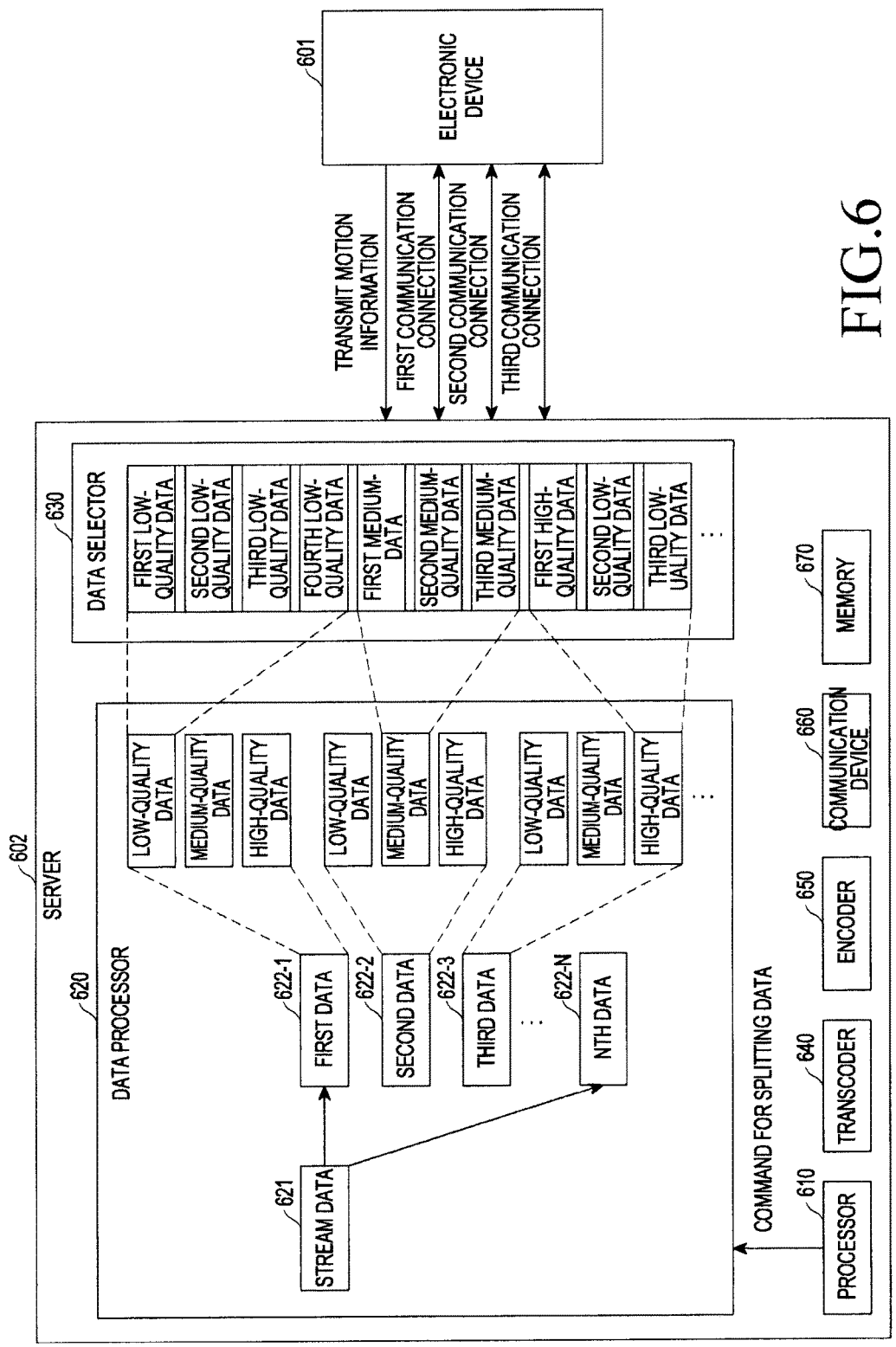
FIG. 6 is a block diagram illustrating an example of a configuration of a server transmitting an omni-directional image to an electronic device according to an embodiment of the present disclosure.

FIG. 6 is a block diagram illustrating an example of a configuration of a server transmitting an omni-directional image to an electronic device according to an embodiment of the present disclosure.

Referring to FIG. 6, the server 602 may include a processor 610, a data processor 620, a data selector 630, a transcoder 640, an encoder 650, a communication device 660, and a memory 670.

According to an embodiment of the present disclosure, although the data processor 620, the data selector 630, the transcoder 640, the encoder 650, and the communication device 660 are shown to be included in the server 602 as separate components, they may be configured in a single component so that their respective operations may be performed by the processor 610.

According to an embodiment of the present disclosure, the server 602 may receive an omni-directional image from an image capturing device, render the image capturing device to a 2D image, and transmit the rendered image to the electronic device 601.

The processor 610 may perform the overall operation of the server 602. For example, the processor 610 may receive stream data 621 from the image capturing device. The stream data 621 may be one in which each frame of image is captured in every direction and is continuously received, and the stream data 621 may include frame identification information, and image data and metadata of each frame.

According to an embodiment of the present disclosure, the processor 610 may transmit a command for splitting the stream data 621 to the data processor 620. For example, the split command may include instructions to perform control to split the stream data 621 into pieces of data for at least one view direction with respect to the image capturing device. The data processor 620 may split the stream data 621 into first data 622-1 corresponding to a first view direction, second data 622-2 corresponding to a second view direction, third data 622-3 corresponding to a third view direction, and Nth data 622-N corresponding to an Nth view direction. For example, the data processor 620 may identify that the image data captured in the N-degree view direction for a predetermined time is the Nth data 622-N corresponding to the Nth view direction based on the metadata contained in the stream data 621.

According to an embodiment of the present disclosure, the data processor 620 may process the split data into various qualities of data and store in the memory 670. The quality may be set as per various parameters by which image quality can be configured, e.g., such as brightness, resolution, frame per second (FPS), or bitrate. For example, a high quality (first q) of data may represent image data with a resolution of 720 p or more, a medium quality (second q) of data may represent image data with a resolution of 240 p or more and less than 720 p, and a low quality (third quality) of data may represent image data with a resolution of less than 240 p. The reference for quality may be determined according to other various parameters and settings.

The data selector 630 may select a particular number (e.g., three) of data pieces with a particular image quality (e.g., high quality) among the per-quality data pieces processed above based on the motion information transmitted from the electronic device 601 or communication quality. The motion information may include the speed and angle of motion with respect to the electronic device 601 or information about the user's view point traced based on the signal reflection on an eye of the user of the electronic device 601.

According to an embodiment of the present disclosure, the data selector 630 may identify the view direction corresponding to the motion information transmitted from the electronic device 601 and select the data corresponding to the identified view direction as data corresponding to the motion information. For example, as the data selector 630 identifies that the third data 622-3 is the data corresponding to the view direction, the data selector 630 may select the high-quality data among the per-quality data pieces for the third data 622-3.

According to an embodiment of the present disclosure, when the stream data 621 is mapped to a 3D space, the data selector 630 may identify the second view direction of data that is mapped to a surrounding of the region where the third data 622-3 has been mapped and select the data processed with the medium quality for the second view direction of data.

For example, the data selector 630 may identify the second data 622-2 including, as metadata, second image capturing range information, which corresponds to the surrounding of the region corresponding to the first image capturing range information contained in the metadata of the first data 622-1, and the data selector 630 may select the medium-quality data among the per-quality data pieces for the second data 622-2.

According to an embodiment of the present disclosure, the data selector 630 may select the low-quality data among the per-quality data pieces for the other data than the second data 622-2 and the third data 622-3 of the stream data 621. In contrast, the data selector 630 may select the high-quality data for the data that has been sent to a plurality of external electronic devices a predetermined number of times among the data pieces except for the second data 622-2 and the third data 622-3 of the stream data 621.

According to an embodiment of the present disclosure, the data selector 630 may identify each data frame except for the second data 622-2 and the third data 622-3 of the stream data 621 and select the high-quality data among the per-quality data pieces for the data containing predetermined object identification information among the identified frames. For example, the object identification information may be generated by identifying the region of the object displayed in a particular frame according to an image analysis operation and identifying the identifier (ID) of the object or may be one inserted according to an input received from the outside.

The transcoder 640 may map the omni-directional image to a 2D image. For example, the transcoder 640 may map two images which have been captured by a fisheye lens and received from the image capturing device to a 3D image and map the same to a 2D image. In this case, to map the omni-directional image to the 3D image, the transcoder 640 may map the omni-directional image to an outer or inner surface of a virtual 3D model.

According to an embodiment of the present disclosure, the transcoder 640 may generate metadata for the relationship in coordinates between the mapped 3D image and the mapped 2D image while simultaneously mapping the 3D image to the 2D image.

The encoder 650 may encode the 2D image received from the transcoder 640 and store the encoded image in the form of streaming or a file. For example, the encoder 650 may perform encoding based on a codec standard, e.g., H.264, MPEG-4, or HEVC, and store the encoded image data in the memory 670 in the form of a video or still image.

The communication device 660 may receive the motion information and transmit data selected by the data selector 630 to the electronic device 601 via a first communication connection (e.g., LTE), a second communication connection (e.g., cellular), and a third communication connection (e.g., Wi-Fi) using different communication schemes. For example, the communication device 660 may transmit the high-quality data through the first communication connection with the highest communication quality among the plurality of communication connections.

According to an embodiment of the present disclosure, where the communication quality (e.g., transmission speed) of the first communication connection is not less than a preset value, the communication device 660 may transmit the data selected by the data selector 630 through the first communication connection. Also, the communication device 660 may transmit part of the low-quality data through the second communication connection according to the bandwidth of the second communication connection. As such, the communication device 660 may distributively transmit data through each communication connection so that the data selected by the data selector 630 is transmitted for a unit time.

The memory 670 may store the data distributed from the stream data 621, the data processed per quality of the distributed data, and the metadata of each data piece. The metadata may include sensing information (e.g., the position or direction of the image capturing device, or motion information or image capturing range information about the image capturing device) sensed by the image capturing device upon frame capturing or frame identification information.

According to an embodiment of the present disclosure, the memory 670 may further store the captured object information in the frame or motion information to the external electronic device. The object information may include information about whether the designated object has been captured, the type of object (e.g., a thing, figure, or scene), object identification information (e.g., figure A or the scene of car explosion), or whether the region of display of the object in the frame or the quality is varied (e.g., set to high quality or medium quality). The motion information to the external electronic device may be one in which a plurality of motion information pieces received from a plurality of external electronic devices have been analyzed, and the motion information may include view direction information about data output from the plurality of external electronic device a predetermined number of times or more at a particular frame view point.

Figure 7:
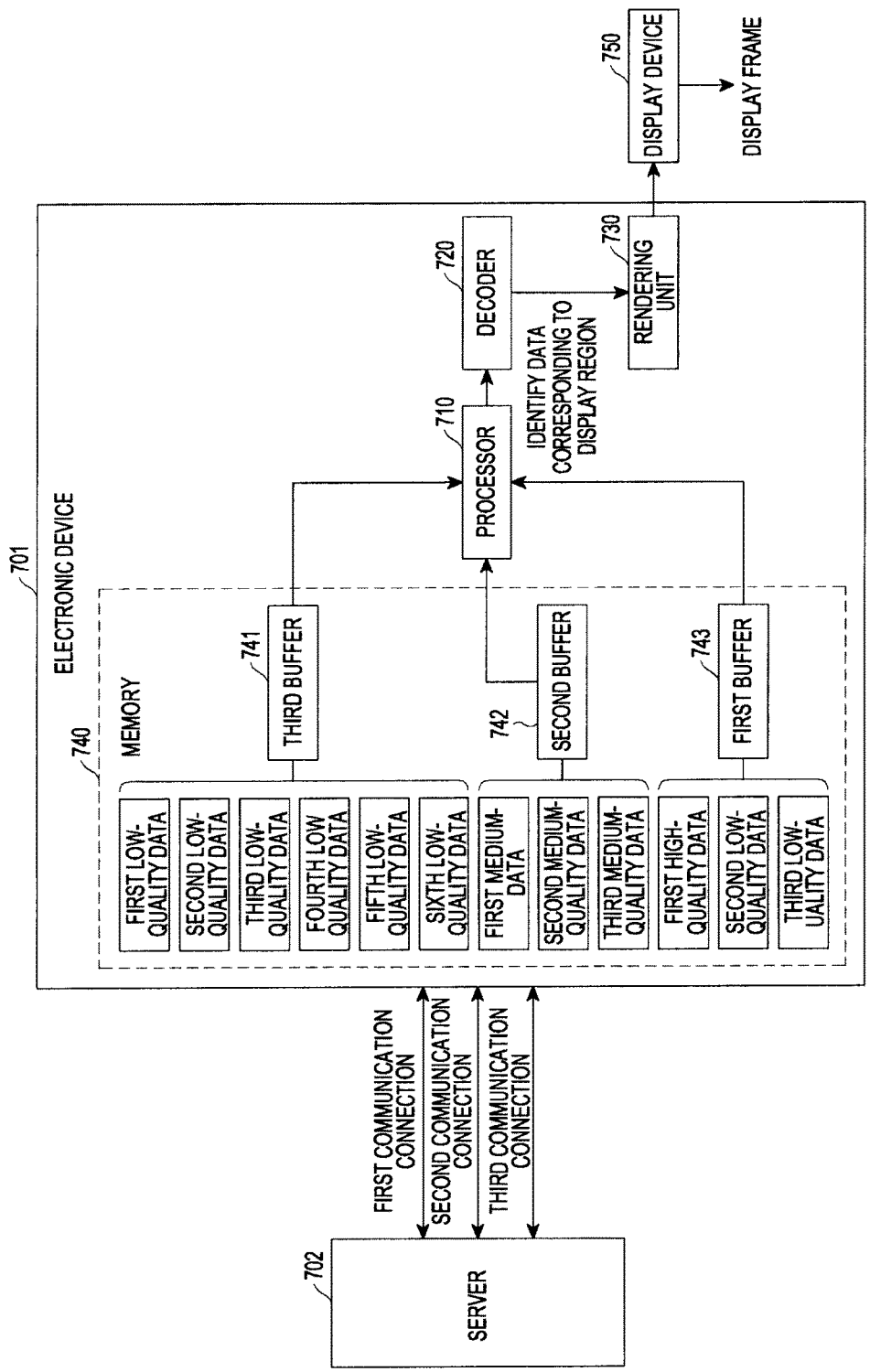
FIG. 7 is a block diagram illustrating an example of a configuration of an electronic device receiving an omni-directional image from an external electronic device according to an embodiment of the present disclosure.

FIG. 7 is a block diagram illustrating an example of a configuration of an electronic device receiving an omni-directional image from an external electronic device according to an embodiment of the present disclosure.

Referring to FIG. 7, the electronic device 701 may include a processor 710, a decoder 720, a rendering unit 730, and a memory 740. The electronic device 701 may be connected with a display device 750 inside or outside the electronic device 701 to perform control to output data through the display device 750.

The processor 710 may perform the overall operation of the electronic device 701. The processor 110 may perform control to receive a first to third quality of data from a server 702, store the data in the memory 740, and display the data through the display device 750.

According to an embodiment of the present disclosure, upon receiving an output input for an omni-directional image, the processor 710 may perform control so that, among first high-quality data, first medium-quality data, and first low-quality data, corresponding to a first view direction, the first high-quality data is delivered to the decoder 720.

The processor 710 may transmit motion information related to a second view direction of the electronic device 701 to the server 702. As the motion information is transmitted, second high-quality data, second medium-quality data, and second low-quality data corresponding to the second view direction may be received from the server 702.

According to an embodiment of the present disclosure, as the second high-quality data is received within a predetermined time, the processor 710 may perform control so that the first high-quality data is delivered to the decoder 720. In contrast, unless the second high-quality data or the second medium-quality data is received within the predetermined time or stored in a first buffer 741 or a second buffer 742, the processor 710 may perform control so that the first medium-quality data or the first low-quality data is delivered to the decoder 720.

The processor 710 may perform control so that the high-quality data stored in the first buffer 741 is delivered to the decoder 720 at predetermined cycles. For example, the high-quality data stored in the first buffer 741 may include image data captured in the view direction at a particular view point as the motion information of the electronic device 701 is predicted or image data having a predetermined object captured therein.

The decoder 720 may decode the data delivered from the first to third buffers 741 to 743. The decoder 720 may perform decoding using the same codec standard (e.g., H.264, MPEG-4, or HEVC) as the codec standard that was used upon encoding the 2D image in the encoder of the server 702 that has transmitted the image data.

The rendering unit 730 may perform rendering based on the decoded 2D image (hereinafter, "input frame"). For example, the rendering unit 730 may further use metadata for rendering. Here, the metadata may be generated on the transmit part and delivered to the receive part or may previously be stored in a storage unit (not shown) of the receive part. For example, where JPEG encoding has been performed on the transmit part, the metadata may be contained in the exif field of the JPEG, and where MPEG-4 compression has been performed on the transmit part, the metadata may be contained in the moov field of the MPEG-4. The metadata may be included in an end of the image frame.

The memory 740 may include at least one buffer (e.g., the first buffer 741, the second buffer 742, or the third buffer 743). The first buffer 741, the second buffer 742, or the third buffer 743 may store per-quality data or per-frame data.

The display device 750 may be communicably connected with the electronic device 701 and may be positioned inside or outside the electronic device 701. The display device 750 may display data rendered by the rendering unit 730.

Figure 8A:
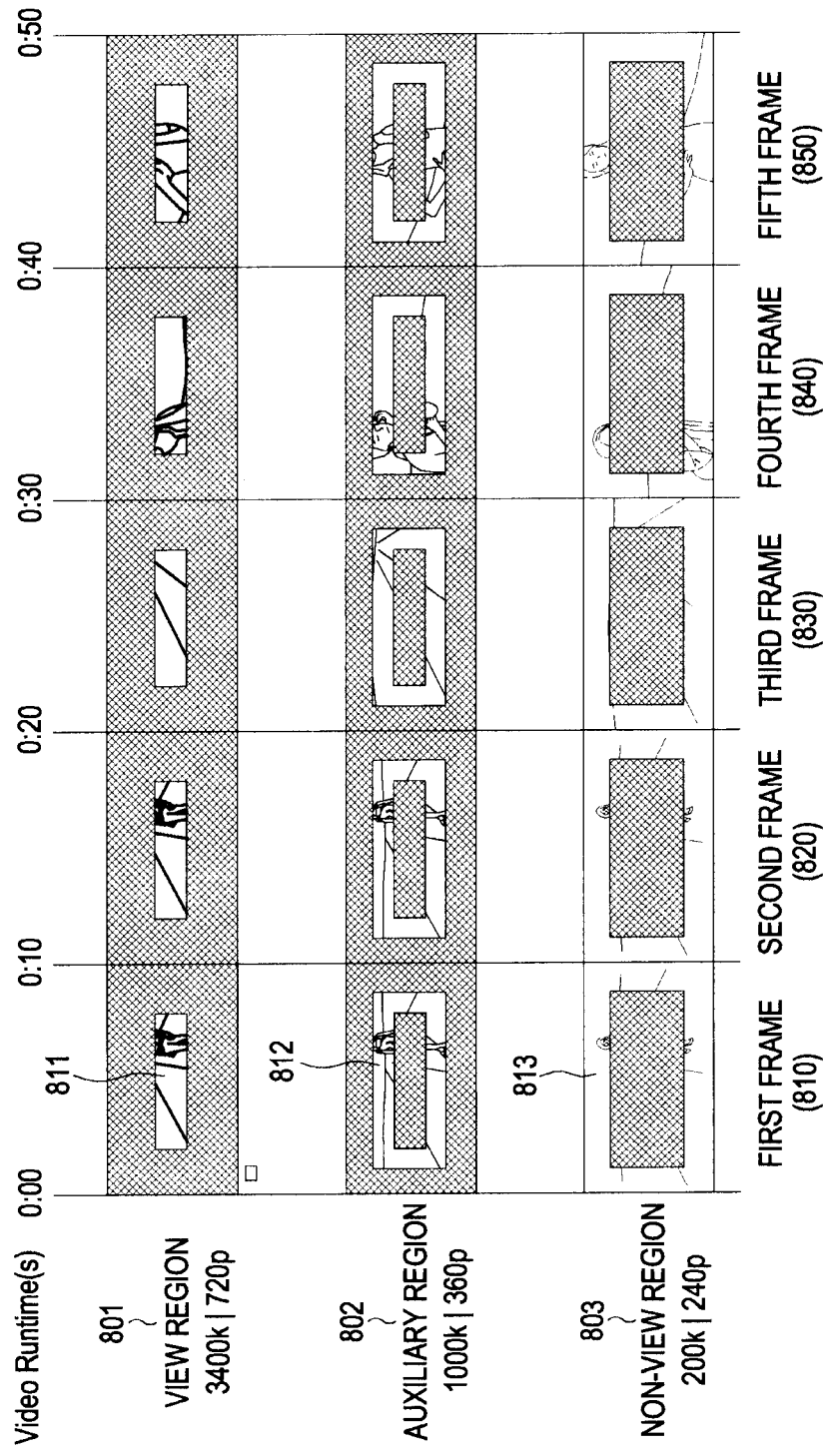
FIG. 8A is a view illustrating an example of representing data corresponding to a view direction stored in an electronic device as an image according to an embodiment of the present disclosure.

FIG. 8A is a view illustrating an example of representing data corresponding to a view direction stored in an electronic device as an image according to an embodiment of the present disclosure.

Referring to FIG. 8A, data corresponding to a particular view direction (e.g., data 801 of a view region, data 802 of an auxiliary view region, or data 803 of a non-view region) received from an external electronic device (e.g., an image capturing device or server) may include per-image capturing region data. For example, the frame rate of the omni-directional image may be set to be 0.1 fps, one frame may be output for 10 seconds, and the frame rate may be set to other various values. As seen therein, a particular video may include first through fifth frames 810-850 with a runtime of 50 seconds.

According to an embodiment of the present disclosure, the per-image capturing region data may include the data 801 of view region, the data 802 of auxiliary view region, or the data 803 of non-view region. The data 801 of view region may include image data captured at an angle corresponding to the particular view direction of the image capturing device, and the data 802 of auxiliary view region may include image data captured in the position further rotated at a predetermined angle from the angle at which the data 801 of view region has been captured by the image capturing device. The data 801 of view region may include the first image capturing region information as metadata so that image data containing, as image capturing region information, the second image capturing region within a predetermined distance from the first image capturing region may be identified as the data 802 of auxiliary view region.

The data 803 of non-view region may include image data including image capturing region information different from the first image capturing region and the second image capturing region in the omni-directional image. According to the state of communication between the external electronic device (e.g., a server or image capturing device) and the electronic device, the data 803 of non-view region may not be received by the electronic device or may be set with a quality of not more than a predetermined value and transmitted.

According to an embodiment of the present disclosure, when the electronic device receives first quality of first data 811, second data 812 of a second quality different from the first quality, and third data 813 of a third quality different from the first and second quality corresponding to the first view direction, the electronic device may output the first quality of first data 811 as a first frame 810 corresponding to the first view direction. In the example, the view region 801 includes the image 811 for first frame 810, rendered at 3400 k and 720 p resolution. Similarly, an auxiliary region 802 which is adjacent to the view region 801 (and thus has high potential for the user to view if she moves her head, or maybe glimpsed at peripherally by the user) is rendered at 1000 k and 360 p resolution, taking the form of an image area 812 circumferentially surrounding the view region 811. Lastly, the non-review region 803 is rendered at 200k and 240 p resolution, and takes the form of an image 813 circumferentially surrounding the auxiliary region 812. Because the user is unlikely to view this region, it can be rendered with less intensive image requirements resulting in savings for processor and network load.

According to an embodiment of the present disclosure, as the motion information of the electronic device corresponding to the second view direction is transmitted to the external electronic device, the electronic device may receive first quality of fourth data, fifth data of second quality different from the first quality, and sixth data of third quality different from the first and second quality corresponding to the second view direction. The electronic device may output the received first quality of fourth data, fifth data of second quality, and sixth data of third quality as a second frame 820.

According to an embodiment of the present disclosure, unless the first quality of fourth data 814 is received within a predetermined time, the electronic device may output the second quality of second data 815 as the second frame 820. Unless the second quality of fifth data 812 is received within a predetermined time, the electronic device may output the third quality of third data 813 as the second frame 820.

Figure 8B:
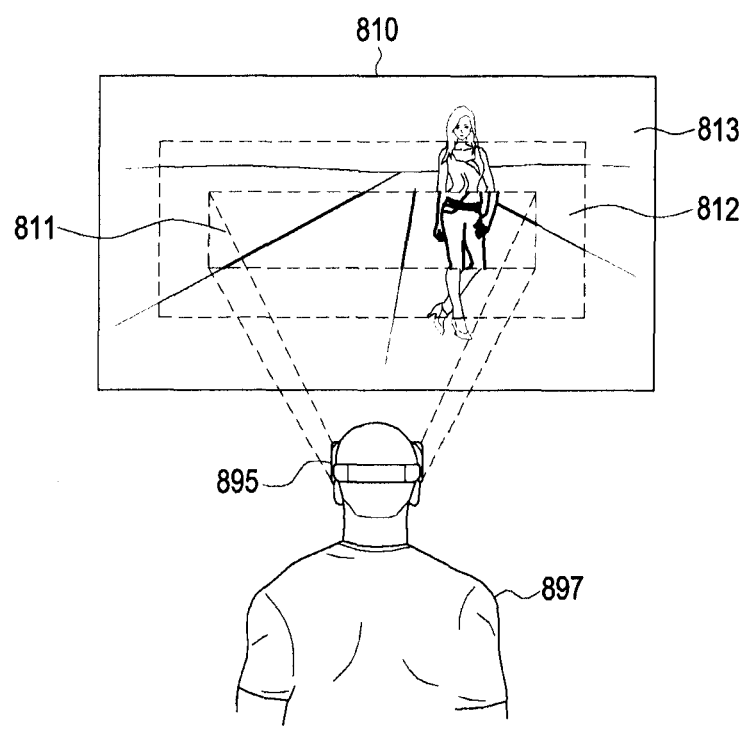
FIG. 8B is a view illustrating an example of an omni-directional image displayed on an electronic device according to an embodiment of the present disclosure.

FIG. 8B is a view illustrating an example of an omni-directional image displayed on an electronic device according to an embodiment of the present disclosure.

Referring to FIG. 8B, the electronic device 895 may be an HMD firmly worn on the user 897's body (e.g., her head) and may output a partial image 810 of an omni-directional image as data corresponding to the view direction of the user 897 or the electronic device 895.

According to an embodiment of the present disclosure, when the electronic device receives first quality of first data 811, second data 812 of a second quality different from the first quality, and third data 813 of a third quality different from the first and second quality corresponding to the first view direction, the electronic device may output the first quality of first data 811 as a first frame corresponding to the first view direction. For example, as in FIG. 8A, the first data 811 may be rendered at 720 p resolution, the second data 812 at 360 p resolution, and the third data 813 at 240 p resolution.

According to an embodiment of the present disclosure, as the data corresponding to the first view direction is received as data with different qualities depending on image capturing regions, the electronic device may reduce the amount of communication for receiving the data (e.g., the second data 812 and the third data 813) obtained by capturing the region where the user 897 does not view.

Figure 9:
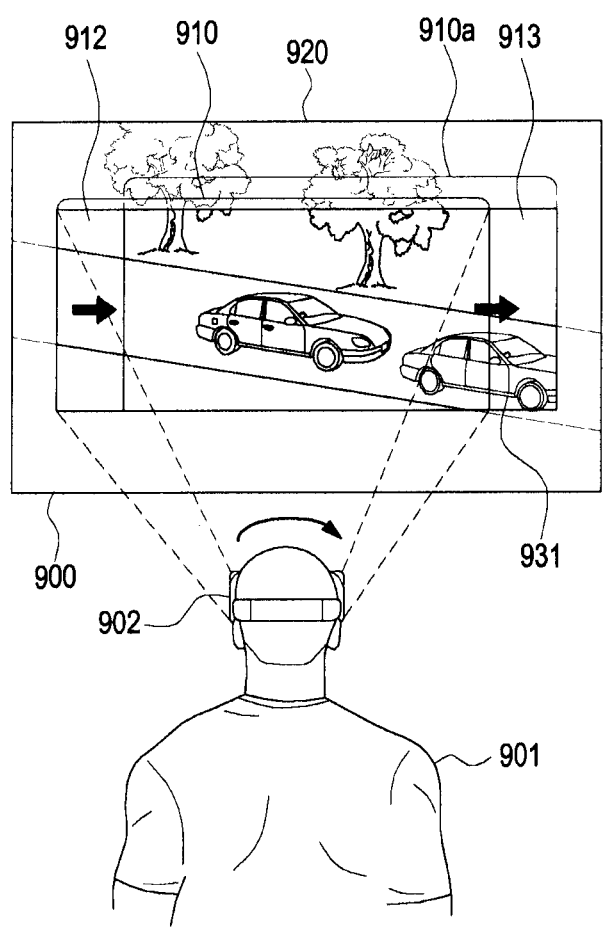
FIG. 9 is a view illustrating an example of an omni-directional image displayed on an electronic device according to an embodiment of the present disclosure.

FIG. 9 is a view illustrating an example of an omni-directional image displayed on an electronic device according to an embodiment of the present disclosure.

Referring to FIG. 9, the electronic device 902 may be an HMD securely worn on the user 901's body (e.g., her head) and may output a partial image 900 representing a user's field of view within a greater omni-directional image, the user's field of view taking into account a viewing orientation of the user 901 or the electronic device 902.

According to an embodiment of the present disclosure, as information related to the first view direction is transmitted to an external electronic device, the electronic device 902 may receive first and second data 912 and 913 of a first quality corresponding to the first view direction and second data 920 of a second quality different from the first quality and output the first quality of first and second data 910 as a first frame.

According to an embodiment of the present disclosure, as a request for data for a partial image 900 of the omni-directional image is transmitted to the external electronic device, the electronic device 902 may receive the second data 913 corresponding to a second view direction different from the present viewing direction (e.g., the first view direction) of the user 901 or the electronic device 902. For example, the second data 913 may include capturing a predetermined object (e.g., the first object 931) within the first frame at the angle corresponding to the second view direction.

According to an embodiment of the present disclosure, the external electronic device may identify the motion information of the captured object, process the data corresponding to the view direction in which the object has been captured in the frame into the first quality according to the motion information, and transmit to the electronic device 902. Accordingly, when the user 901 or the electronic device 902 turns to the second direction corresponding to the direction where the first object 931 moves, the user 901 may view the second data 913 corresponding to the second view direction in the first quality although the electronic device 902 does not transmit information related to the second view direction to the external electronic device.

Figure 10:
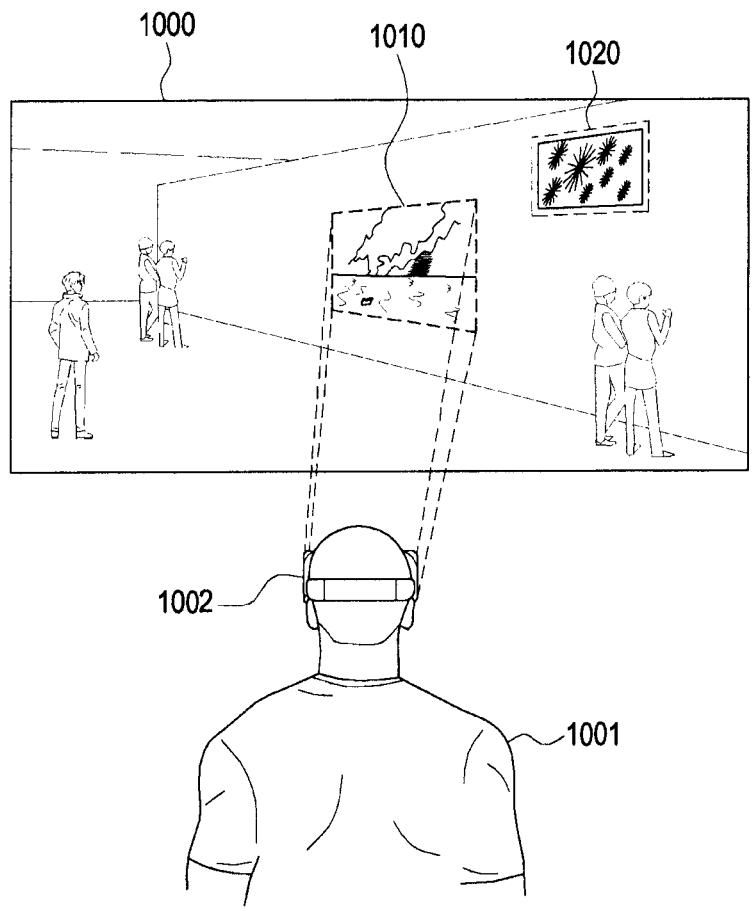
FIG. 10 is a view illustrating an example of an omni-directional image displayed on an electronic device according to an embodiment of the present disclosure.

FIG. 10 is a view illustrating an example of an omni-directional image displayed on an electronic device according to an embodiment of the present disclosure.

Referring to FIG. 10, the electronic device 1002 may be an HMD securely worn on the user 1001's body (e.g., her head) and may output data corresponding to an omni-directional image 1000, of which a portion thereof corresponds to the view direction of the user 1001 or the electronic device 1002.

According to an embodiment of the present disclosure, as information related to the first view direction is transmitted to an external electronic device, the electronic device 1002 may receive first data 1010 of a first quality corresponding to the first view direction of the user and second data 1020 of a second quality different from the first quality, and output the first quality of first data 1010 as a first frame.

According to an embodiment of the present disclosure, as a request for data for data for the omni-directional image 1000 is transmitted to the external electronic device, the electronic device 1002 may receive third data corresponding to a second view direction different from the view direction (e.g., the first view direction) of the user 1001 or the electronic device 1002. For example, the third data may include image data obtained by capturing a predetermined object (e.g., the first object) captured in the first frame at the angle corresponding to the second view direction.

According to an embodiment of the present disclosure, the external electronic device may process the data corresponding to the view direction in which a predetermined object has been captured into the first quality according to the motion information and transmit to the electronic device 1002. Accordingly, although the user 1001 does not turn the electronic device 1002 to the second view direction corresponding to the captured direction of the first object to transmit the information related to the second view direction to the external electronic device, the electronic device 1002 may receive the first quality of third data corresponding to the second view direction.

According to an embodiment of the present disclosure, upon outputting the first frame, the electronic device 1002 may perform control to further output an indication for receipt of the first quality of third data or an indication for the second view direction so that the user 1001 may turn the electronic device 1002 to the second view direction to view the third data.

Figure 11:
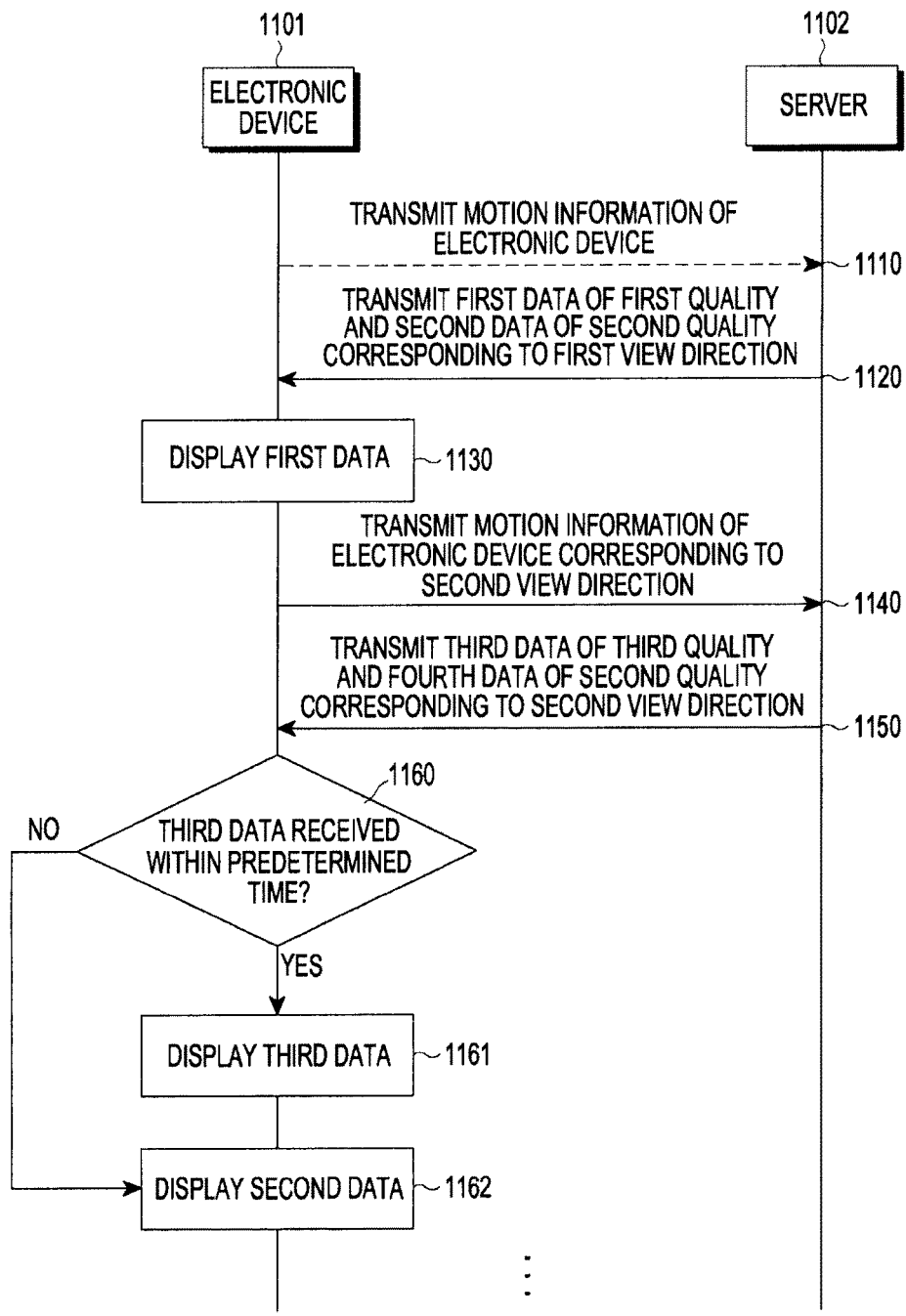
FIG. 11 is a flowchart illustrating an example of transmitting and receiving data corresponding to a view direction between an electronic device and a server according to an embodiment of the present disclosure.

FIG. 11 is a flowchart illustrating an example of transmitting and receiving data corresponding to a view direction between an electronic device and a server according to an embodiment of the present disclosure.

Referring to FIG. 11, the electronic device 1101 may transmit a request for an omni-directional image to an external electronic device (e.g., a server 1102), and accordingly, the electronic device 1101 may receive data corresponding to a particular view direction of the omni-directional image from the server 1102.

Once the above operations are established, then as depicted in operation 1110, the electronic device 1101 may transmit motion information of the electronic device 1101 to the server 1102. If the electronic device 1101 transmits only a request for the omni-directional image without transmitting the motion information to the server 1102 in which case operation 1110 may not perform operation 1110.

In operation 1120, the server 1102 may transmit, to the electronic device 1101, first data having a first quality (e.g., a first quality tier of resolution) corresponding to the first view direction, and second data of a second quality different from the first quality (e.g., a second quality tier of a lower resolution). The first view direction may indicate a field of view for the user indicate a sub-image within a greater omindirectional image, the particular sub-image corresponding to the motion information received from the electronic device 1101, and/or a predetermined direction, and the first view direction may be one of the directions of view captured within the omni-directional image.

In operation 1130, the electronic device 1101 may display the first data in the first quality (e.g., first resolution) through a display device.

In operation 1140, the electronic device 1101 may transmit motion information of the electronic device 1101 related to a second viewing direction to the server 1102. That is, if the user moves his head, information indicating the movement is transmitted to the server 1102.

In operation 1150, the server 1102 may transmit third data of a first quality corresponding to the second view direction, and fourth data of the second quality to the electronic device 1101. In other words, a new image representing a new field of view of the user may be transmitted to the electronic device 1101 in the first tier resolution. Similarly, a second new image representing an image data surrounding the new image may be transmitted to the electronic device 1101 in the second tier resolution.

In operation 1160, the electronic device 1101 may identify whether the first quality of third data corresponding to the second view direction is received within a predetermined time.

Where as a result of operation 1160 the third data is received within the predetermined time, the electronic device 1101 may display the third data through the display device in operation 1161.

According to operation 1160, when the third data is not received within the predetermined time, the electronic device 1101 may display the second data having the second quality (e.g., second tier resolution) previously received through the display device in operation 1162.

Figure 12:
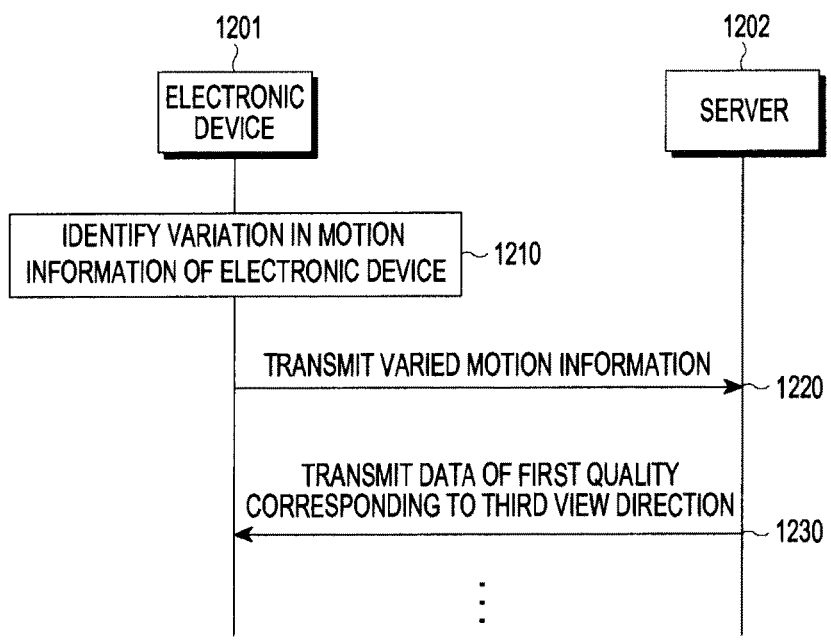
FIG. 12 is a flowchart illustrating an example of transmitting and receiving data corresponding to a view direction between an electronic device and a server according to an embodiment of the present disclosure.

FIG. 12 is a flowchart illustrating an example of transmitting and receiving data corresponding to a view direction between an electronic device and a server according to an embodiment of the present disclosure.

Referring to FIG. 12, as the electronic device 1201 transmits motion information to an external electronic device (e.g., a server 1202), the electronic device 1201 may continually receive data corresponding to a user's field of view within the omni-directional image from the server 1202. Specifically, the user's field of view may be received and rendered at the first quality or first tier of visual quality (e.g., resolution), as received from the server 1202.

In operation 1210, while the above operations occur the electronic device 1201 may detect variations in the movement of the electronic device 1201 (e.g., as the user moves his or her head), which can be termed "varied" motion information. For example, the electronic device 1201 may determine whether the motion angle and speed of the electronic device 1201 for a predetermined time or the view information of the user has been changed by at least a predetermined value.

In operation 1220, if the conditions are met (e.g., a movement greater than the predetermined value), the electronic device 1201 may transmit the varied motion information to the server 1202, to update the server on the user's new field of view.

In operation 1230, the server 1202, based on the varied motion information, may predict that the electronic device 1201 will be oriented such that the user's field of view will shift to a third viewing direction corresponding to a particular view point. Accordingly, the server 1202 may transmit imagery at the first quality of data corresponding to the third view direction within the omni-directional image to the electronic device 1201.

According to an embodiment of the present disclosure, as the varied motion information is identified and transmitted to the server 1202, the electronic device 1201 may receive the first quality of data corresponding to the third view direction even without transmitting information related to the third view direction at the particular view point to the server 1202.

Figure 13:
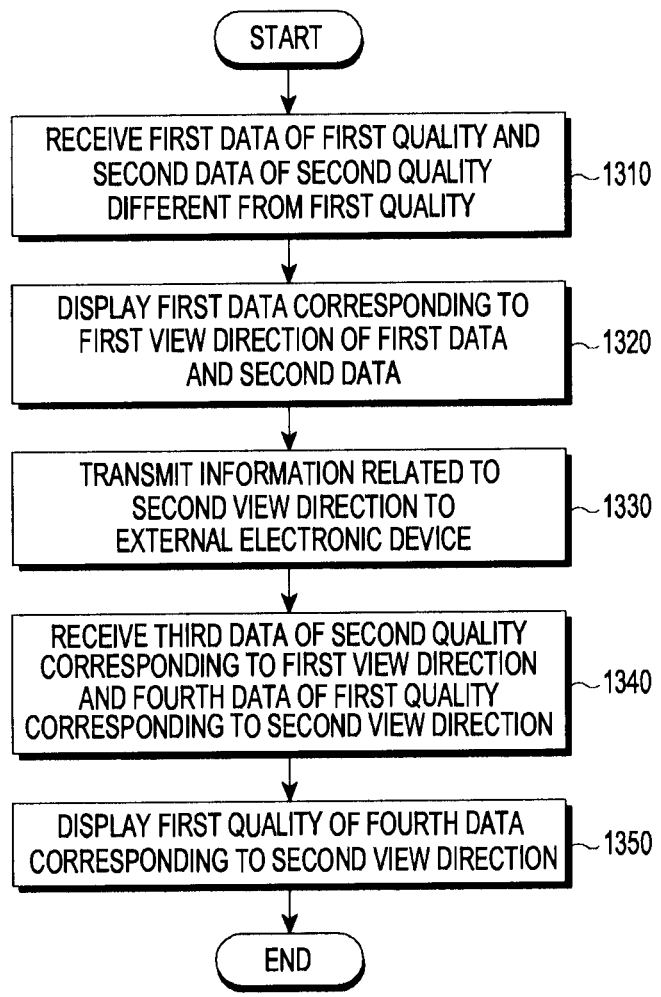
FIG. 13 is a flowchart illustrating an example of processing data corresponding to a view direction by an electronic device according to an embodiment of the present disclosure.

FIG. 13 is a flowchart illustrating an example of processing data corresponding to a view direction by an electronic device according to an embodiment of the present disclosure.

In operation 1310, an electronic device may receive first data of a first quality and second data of a second quality, different from the first quality.

In operation 1320, the electronic device may display the first data and second data. The first data may correspond to a user's first viewing direction or field of view within an omindirectional image or media.

In operation 1330, the electronic device may transmit information related to a second view direction to an external electronic device. For example, if the user moves their head such that the field of view changes, the movement information may be transmitted to the external electronic device.

In operation 1340, the electronic device may receive second quality of third data corresponding to the first view direction and first quality of fourth data corresponding to the second view direction. That is, display information related to the new field of view is received.

In operation 1350, the electronic device may display the first quality of fourth data corresponding to the second view direction. That is, the correct imagery is displayed for the new field of view.

Figure 14:
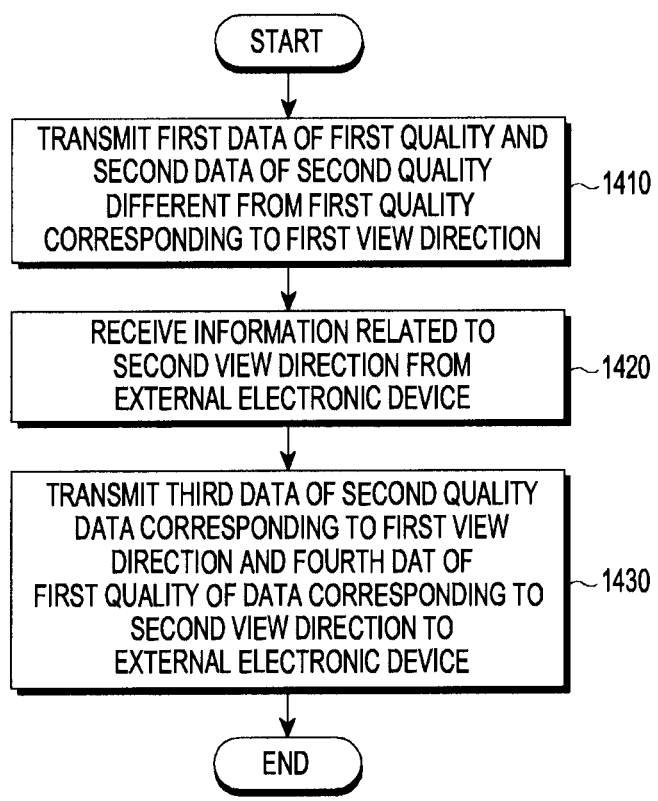
FIG. 14 is a flowchart illustrating an example of transmitting data corresponding to a view direction from an external electronic device according to an embodiment of the present disclosure.

FIG. 14 is a flowchart illustrating an example of transmitting data corresponding to a view direction from an external electronic device according to an embodiment of the present disclosure.

In operation 1410, the electronic device may transmit first data of a first quality and second data of a second quality different from the first quality to an external electronic device. The first data may correspond to a particular field of view or viewing direction within an omni-directional image.

In operation 1420, the electronic device may receive information related to a second view direction from the external electronic device.

In operation 1430, the electronic device may transmit a third quality of third data of the data corresponding to the first view direction and a first quality of fourth data of the data corresponding to the second view direction to the external electronic device.

According to an embodiment of the present disclosure, the server may transmit the first quality of first data and the fourth data through a first communication connection and the second quality of the second data and the third data through a second communication connection different from the first communication connection. The first communication connection may transmit data at a higher communication speed than the second communication connection. In contrast, where the communication speed of the first communication connection is not less than a designated value or the communication speed of the second communication connection is less than a designated value, the second quality of second data and fourth data may be transmitted through the first communication connection.

FIG. 15 is a view illustrating an example of a network environment according to an embodiment of the present disclosure.

Referring to FIG. 15, an electronic device 1501 is included in a network environment 1500, and the electronic device 1501 may include a bus 1510, a processor 1520, a memory 1530, an input/output interface 1550, a display 1560, and a communication interface 1570.

According to an embodiment of the present disclosure, the electronic device 1501 may exclude at least one of the components or may add another component. The bus 1510 may include a circuit for connecting the components 1510 to 1570 with one another and transferring communications (e.g., control messages or data) between the components. The processing module 1520 may include one or more of a central processing unit (CPU), an application processor (AP), or a communication processor (CP). The processor 1520 may perform control on at least one of the other components of the electronic device 1501 or perform an operation or data processing relating to communication.

The memory 1530 may include a volatile or non-volatile memory. For example, the memory 1530 may store commands or data related to at least one other component of, e.g., the electronic device 1501. According to an embodiment of the present disclosure, the memory 1530 may store software or a program 1540. The program 1540 may include, e.g., a kernel 1541, middleware 1543, an application programming interface (API) 1545, or an application program (or "application") 1547. At least a portion of the kernel 1541, middleware 1543, or API 1545 may be denoted an operating system (OS). For example, the kernel 1541 may control or manage system resources (e.g., the bus 1510, processor 1520, or a memory 1530) used to perform operations or functions implemented in other programs (e.g., the middleware 1543, API 1545, or application program 1547). The kernel 1541 may provide an interface that allows the middleware 1543, the API 1545, or the application 1547 to access the individual components of the electronic device 1501 to control or manage the system resources.

The middleware 1543 may function as a relay to allow the API 1545 or the application 1547 to communicate data with the kernel 1541, for example. Further, the middleware 1543 may process one or more task requests received from the application program 1547 in order of priority. For example, the middleware 1543 may assign a priority of using system resources (e.g., bus 1510, processor 1520, or memory 1530) of the electronic device 1501 to at least one of the application programs 1547 and process one or more task requests. The API 1545 is an interface allowing the application 1547 to control functions provided from the kernel 1541 or the middleware 1543. For example, the API 133 may include at least one interface or function (e.g., a command) for filing control, window control, image processing or text control. For example, the input/output interface 1550 may transfer commands or data input from the user or other external device to other component(s) of the electronic device 1501 or may output commands or data received from other component(s) of the electronic device 1501 to the user or other external devices.

The display 1560 may include, e.g., a liquid crystal display (LCD), a light emitting diode (LED) display, an organic light emitting diode (OLED) display, or a microelectromechanical systems (MEMS) display, or an electronic paper display. The display 1560 may display, e.g., various contents (e.g., text, images, videos, icons, or symbols) to the user. The display 1560 may include a touchscreen and may receive, e.g., a touch, gesture, proximity or hovering input using an electronic pen or a body portion of the user. For example, the communication interface 1570 may set up communication between the electronic device 1501 and an external electronic device (e.g., a first electronic device 1502, a second electronic device 1504, or a server 1506). For example, the communication interface 1570 may be connected with the network 1562 through wireless or wired communication to communicate with the external electronic device (e.g., the second external electronic device 1504 or server 1506).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present disclosure, the wireless communication may include at least one of, e.g., wireless-fidelity (Wi-Fi), light-fidelity (Li-Fi), bluetooth, bluetooth low power (BLE), zigbee, near-field communication (NFC), magnetic secure transmission (MST), radio frequency (RF), or body area network (BAN) as denoted with element 1564 of FIG. 15. According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 1562 may include at least one of telecommunication networks, e.g., a computer network (e.g., local area network (LAN) or wide area network (WAN)), Internet, or a telephone network.

The first and second external electronic devices 1502 and 1504 each may be a device of the same or a different type from the electronic device 1501. According to an embodiment of the present disclosure, all or some of operations executed on the electronic device 1501 may be executed on another or multiple other electronic devices (e.g., the electronic devices 1502 and 1504 or server 1506). According to an embodiment of the present disclosure, when the electronic device 1501 should perform some function or service automatically or at a request, the electronic device 1501, instead of executing the function or service on its own or additionally, may request another device (e.g., electronic devices 1502 and 1504 or server 1506) to perform at least some functions associated therewith. The other electronic device (e.g., electronic devices 1502 and 1504 or server 1506) may execute the requested functions or additional functions and transfer a result of the execution to the electronic device 1501. The electronic device 1501 may provide a requested function or service by processing the received result as it is or additionally. To that end, a cloud computing, distributed computing, or client-server computing technique may be used, for example.

Figure 16:
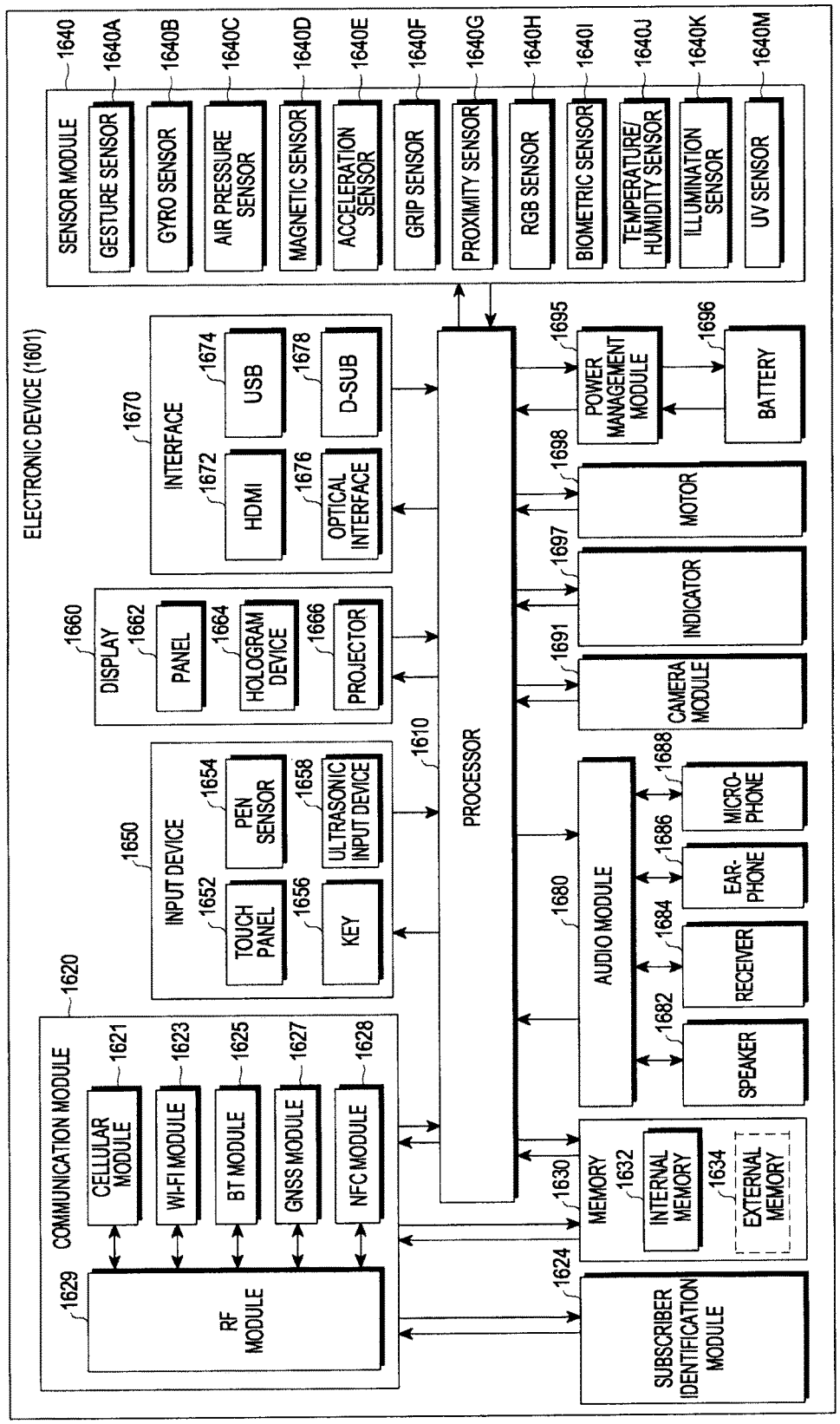
FIG. 16 is a block diagram illustrating an example of a configuration of an electronic device according to an embodiment of the present disclosure.

FIG. 16 is a block diagram illustrating an example of a configuration of an electronic device according to an embodiment of the present disclosure.

According to an embodiment of the present disclosure, an electronic device 1601 may include the whole or part of, e.g., the electronic device 1501 shown in FIG. 15.

Referring to FIG. 16, the electronic device 1601 may include one or more processors (e.g., application processors (APs)) 1610, a communication module 1620, a subscriber identification module (SIM) 1624, a memory 1630, a sensor module 1640, an input device 1650, a display 1660, an interface 1670, an audio module 1680, a camera module 1691, a power management module 1695, a battery 1696, an indicator 1697, and a motor 1698. The processor 1610 may control multiple hardware and software components connected to the processor 1610 by running, e.g., an operating system or application programs, and the processor 110 may process and compute various data. The processor 1610 may be implemented in, e.g., a system on chip (SoC). According to an embodiment of the present disclosure, the processor 1610 may further include a graphic processing unit (GPU) or an image signal processor. The processor 1610 may include at least some (e.g., the cellular module 1621) of the components shown in FIG. 16. The processor 1610 may load a command or data received from at least one of other components (e.g., a non-volatile memory) on a volatile memory, process the command or data, and store resultant data in the non-volatile memory.

The communication module 1620 may have the same or similar configuration to the communication interface 1570. The communication module 1620 may include, e.g., a cellular module 1621, a wireless fidelity (Wi-Fi) module 1623, a bluetooth (BT) module 1625, a GNSS module 1627, a NFC module 1628, and a RF module 1629. The cellular module 1621 may provide voice call, video call, text, or Internet services through, e.g., a communication network. According to an embodiment of the present disclosure, the cellular module 1621 may perform identification or authentication on the electronic device 1601 in the communication network using a subscriber identification module 1624 (e.g., the SIM card). According to an embodiment of the present disclosure, the cellular module 1621 may perform at least some of the functions providable by the processor 1610. According to an embodiment of the present disclosure, the cellular module 1621 may include a communication processor (CP). According to an embodiment of the present disclosure, at least some (e.g., two or more) of the cellular module 1621, the Wi-Fi module 1623, the Bluetooth module 1625, the GNSS module 1627, or the NFC module 1628 may be included in a single integrated circuit (IC) or an IC package. The RF module 1629 may transmit and receive, e.g., communication signals (e.g., radio frequency (RF) signals). The RF module 1629 may include, e.g., a transceiver, a power amp module (PAM), a frequency filter, a low noise amplifier (LNA), or an antenna. According to an embodiment of the present disclosure, at least one of the cellular module 1621, the Wi-Fi module 1623, the bluetooth module 1625, the GNSS module 1627, or the NFC module 1628 may communicate RF signals through a separate RF module. The subscription identification module 1624 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 1630 (e.g., the memory 1530) may include, e.g., an internal memory 1632 or an external memory 1634. The internal memory 1632 may include at least one of, e.g., a volatile memory (e.g., a dynamic RAM (DRAM), a static RAM (SRAM), a dynamic RAM (DRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 1634 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 1634 may be functionally or physically connected with the electronic device 1601 via various interfaces.

For example, the sensor module 1640 may measure a physical quantity or detect a motion state of the electronic device 1601, and the sensor module 240 may convert the measured or detected information into an electrical signal. The sensor module 1640 may include at least one of, e.g., a gesture sensor 1640A, a gyro sensor 1640B, an atmospheric pressure sensor 1640C, a magnetic sensor 1640D, an acceleration sensor 1640E, a grip sensor 1640F, a proximity sensor 1640G, a color sensor 1640H (e.g., a red-green-blue (RGB) sensor, a bio sensor 1640I, a temperature/humidity sensor 1640J, an illumination sensor 1640K, or an ultra violet (UV) sensor 1640M. Additionally or alternatively, the sensing module 1640 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1640 may further include a control circuit for controlling at least one or more of the sensors included in the sensing module. According to an embodiment of the present disclosure, the electronic device 1601 may further include a processor configured to control the sensor module 1640 as part of the processor 1610 or separately from the processor 1610, and the electronic device 2701 may control the sensor module 1640 while the processor 1610 is in a sleep mode.

The input unit 1650 may include, e.g., a rotation input device 1651, a touch panel 1652, a (digital) pen sensor 1654, a key 1656, or an ultrasonic input device 1658. The touch panel 1652 may use at least one of capacitive, resistive, infrared, or ultrasonic methods. The touch panel 1652 may further include a control circuit. The touch panel 1652 may further include a tactile layer to provide an immediate reaction to the user. The (digital) pen sensor 1654 may include, e.g., part of the touch panel or a separate sheet for recognition. The key 1656 may include e.g., a physical button, optical key or key pad. The ultrasonic input device 1658 may sense an ultrasonic wave generated from an input tool through a microphone (e.g., the microphone 1688) to identify data corresponding to the sensed ultrasonic wave.

According to an embodiment of the present disclosure, the rotation input device 1651 may be functionally connected with a wheel dial member or a wheel scroll button to receive a wheel input from the outside. For example, when a selection object is displayed to be moved through the display 1660, the electronic device 1601 may display an interface for controlling the execution of an application or content based on a wheel input based on the position to which the selection object has moved, and the execution of the application or content may be controlled based on a wheel input received while the interface is displayed.

The display 1660 (e.g., the display 1560) may include a panel 1662, a hologram device 1664, a projector 1666, or a control circuit for controlling the same. The panel 1662 may be implemented to be flexible, transparent, or wearable. The panel 1662, together with the touch panel 1652, may be configured in one or more modules. According to an embodiment of the present disclosure, the panel 1662 may include a pressure sensor (or pose sensor) that may measure the strength of a pressure by the user's touch. The pressure sensor may be implemented in a single body with the touch panel 1652 or may be implemented in one or more sensors separate from the touch panel 1652. The hologram device 1664 may make three dimensional (3D) images (holograms) in the air by using light interference. The projector 1666 may display an image by projecting light onto a screen. The screen may be, for example, located inside or outside of the electronic device 1601. The interface 1670 may include e.g., a high definition multimedia interface (HDMI) 1672, a USB 1674, an optical interface 1676, or a D-subminiature (D-sub) 1678. The interface 1670 may be included in e.g., the communication interface 1570 shown in FIG. 15. Additionally or alternatively, the interface 1670 may include a mobile high-definition link (MHL) interface, a secure digital (SD) card/multimedia card (MMC) interface, or infrared data association (IrDA) standard interface.

The audio module 1680 may converting, e.g., a sound signal into an electrical signal and vice versa. At least part of the audio module 1680 may be included in e.g., the input/output interface 1545 as shown in FIG. 15. The audio module 1680 may process sound information input or output through e.g., a speaker 1682, a receiver 1684, an earphone 1686, or a microphone 1688. For example, the camera module 1691 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 1695 may manage power of the electronic device 1601, for example. According to an embodiment of the present disclosure, the power manager module 1695 may include a power management Integrated circuit (PMIC), a charger IC, or a battery or fuel gauge. The PMIC may have a wired or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1696, a voltage, a current, or a temperature while the battery 296 is being charged. The battery 1696 may include, e.g., a rechargeable battery or a solar battery.

The indicator 1697 may indicate a particular state of the electronic device 1601 or a part (e.g., the processor 1610) of the electronic device, including e.g., a booting state, a message state, or recharging state. The motor 1698 may convert an electric signal to a mechanical vibration and may generate a vibrational or haptic effect. The electronic device 1601 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 1601) may exclude some elements or include more elements, or some of the elements may be combined into a single entity that may perform the same function as by the elements before combined.

Figure 17:
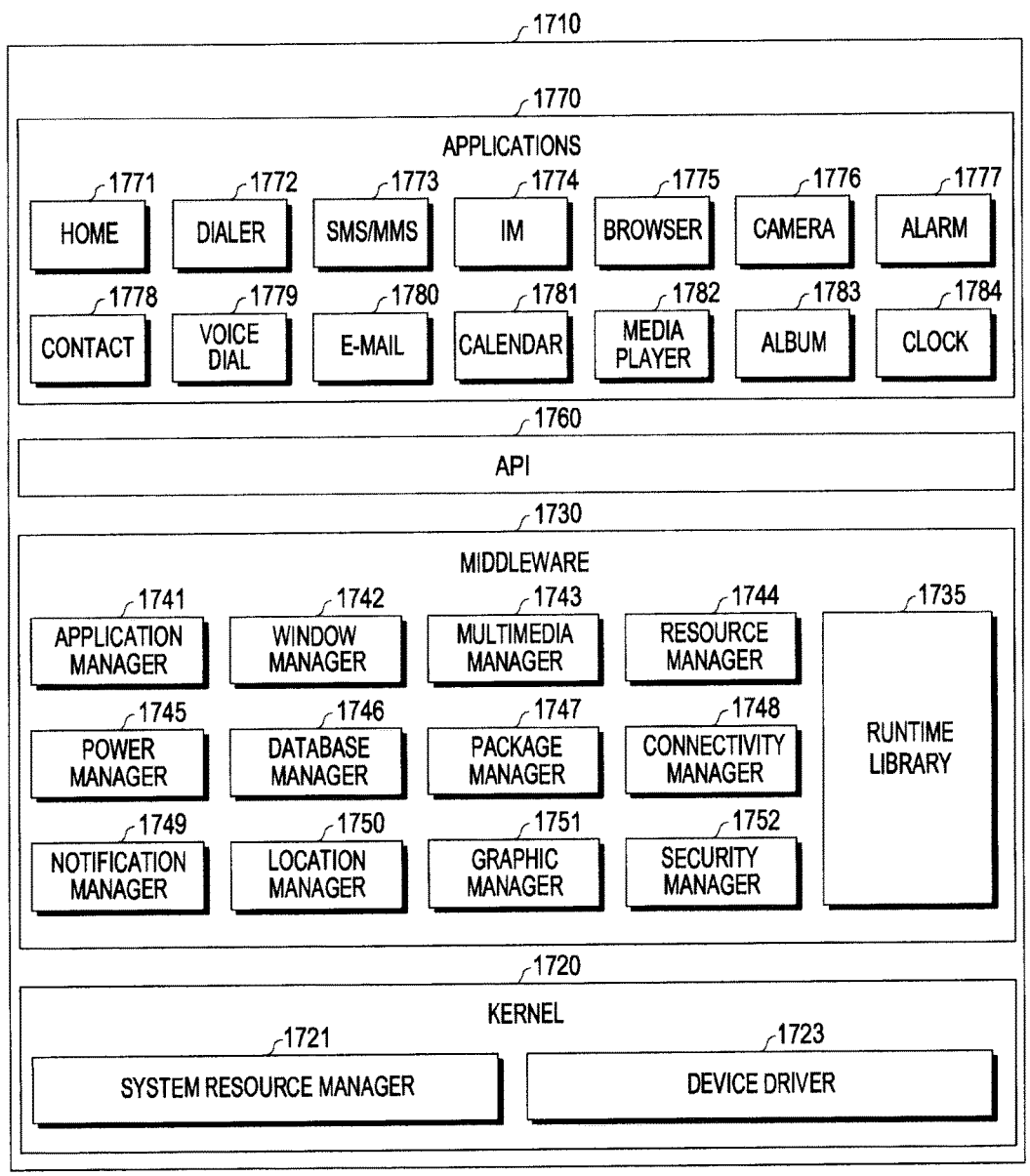
FIG. 17 is a block diagram illustrating an example of a program module configuration according to an embodiment of the present disclosure.

FIG. 17 is a block diagram illustrating an example of a program module configuration according to an embodiment of the present disclosure.

According to an embodiment of the present disclosure, the program module 1710 (e.g., the program 1740) may include an operating system (OS) controlling resources related to the electronic device (e.g., the electronic device 1701) or various applications driven on the operating system. The operating system may include, e.g., Android™, iOS™, Windows™, Symbian™, Tizen™, or Bada™.

Referring to FIG. 17, the program module 1710 may include a kernel 1720, middleware 1730, an API 1760, or an application 1770. At least a part of the program module 1710 may be preloaded on the electronic device or may be downloaded from an external electronic device (e.g., the electronic devices 1702 and 804 or server 1706).

The kernel 1720 may include, e.g., a system resource manager 1721 or a device driver 1723. The system resource manager 1721 may perform control, allocation, or recovery of system resources. According to an embodiment of the present disclosure, the system resource manager 1721 may include a process managing unit, a memory managing unit, or a file system managing unit. The device driver 1723 may include, e.g., a display driver, a camera driver, a Bluetooth driver, a shared memory driver, a USB driver, a keypad driver, a Wi-Fi driver, an audio driver, or an inter-process communication (IPC) driver. The middleware 1730 may provide various functions to the application 1770 through the API 1760 so that the application 1770 may use limited system resources in the electronic device or provide functions jointly utilized by applications 1770. According to an embodiment of the present disclosure, the middleware 1730 may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 may include a library module used by a compiler in order to add a new function through a programming language while, e.g., the application 1770 is being executed. The runtime library 1735 may perform input/output management, memory management, or arithmetic function processing. The application manager 1741 may manage the life cycle of, e.g., the applications 1770. The window manager 1742 may manage GUI resources used on the screen. The multimedia manager 1743 may grasp formats utilized to play media files and use a codec appropriate for a format to perform encoding or decoding on media files. The resource manager 1744 may manage the source code or memory space of the application 1770. The power manager 1745 may manage, e.g., the capacity, temperature, or power of the battery and determine and provide power information utilized for the operation of the electronic device using a corresponding piece of information of such. According to an embodiment of the present disclosure, the power manager 1745 may interwork with a basic input/output system (BIOS). The database manager 1746 may generate, search, or vary a database to be used in the applications 1770. The package manager 1747 may manage installation or update of an application that is distributed in the form of a package file.

The connectivity manager 1748 may manage, e.g., wireless connectivity. The notification manager 1749 may provide an event, e.g., arrival message, appointment, or proximity alert, to the user. The location manager 1750 may manage, e.g., locational information on the electronic device. The graphic manager 1751 may manage graphic effects to be offered to the user and their related user interface. The security manager 1752 may provide system security or user authentication, for example. According to an embodiment of the present disclosure, the middleware 1730 may include a telephony manager for managing the voice or video call function of the electronic device or a middleware module able to form a combination of the functions of the above-described elements. According to an embodiment of the present disclosure, the middleware 1730 may provide a module specified according to the type of the operating system. The middleware 1730 may dynamically omit some existing components or add new components. The API 1760 may be a set of, e.g., API programming functions and may have different configurations depending on operating systems. For example, in the case of Android or iOS, one API set may be provided per platform, and in the case of Tizen, two or more API sets may be offered per platform.

The application 1770 may include an application that may provide, e.g., a home 1771, a dialer 1772, an SMS/MMS 1773, an instant message (IM) 1774, a browser 1775, a camera 1776, an alarm 1777, a contact 1778, a voice dial 1779, an email 1780, a calendar 1781, a media player 1782, an album 1783, or a clock 1784, a health-care (e.g., measuring the degree of workout or blood sugar), or provision of environmental information (e.g., provision of air pressure, moisture, or temperature information). According to an embodiment of the present disclosure, the application 1770 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 1770 may include an application (e.g., a health-care application of a mobile medical device) designated according to an attribute of the external electronic device. According to an embodiment of the present disclosure, the application 1770 may include an application received from the external electronic device. At least a portion of the program module 1710 may be implemented (e.g., executed) in software, firmware, hardware (e.g., the processor 1610), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a computer-readable storage medium (e.g., the memory 1530), e.g., in the form of a program module. The instructions, when executed by a processor (e.g., the processor 1520), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instruction may include a code created by a compiler or a code executable by an interpreter.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

According to an embodiment of the present disclosure, there is provided a storage medium storing commands configured to be executed by at least one processor to enable the at least one processor to perform at least one operation that may include receiving first data of a first quality and second data of a second quality different from the first quality from an external electronic device, displaying the first data corresponding to a first view direction of the first data and the second data, transmitting information related to a second view direction to the external electronic device, receiving third data of the second quality corresponding to the first view direction and fourth data of the first quality corresponding to the second view direction from the external electronic device, and displaying the first quality of fourth data corresponding to the second view direction.

As is apparent from the foregoing description, according to various embodiments of the present disclosure, the electronic device and method for processing image data may reduce the amount of other communicated data than data that the user intends to view by receiving data corresponding to the direction of the user's view via various communication connections or by receiving various image qualities of data.

The embodiments disclosed herein are proposed for description and understanding of the disclosed technology and does not limit the present disclosure. Accordingly, the present disclosure should be interpreted as including all changes or various embodiments based on the present disclosure.

What is claimed is:

1. An electronic device, comprising:
   a communication circuit configured to communicate by using a plurality of communication connections;
   a display device;
   a memory storing program instructions; and
   a processor electrically connected with the communication circuit and the memory, wherein the program instructions are executable by the processor to enable the processor to:
   in response to determining that a user's field of view corresponds to a first field of view, receive from an external electronic device first data of a first quality, and second data of a second quality which is different from the first quality, wherein the first data corresponds to the first field of view,
control the display device to display the first data and the second data, the first data corresponding to a first field of view of a user,
in response to determining that the user's field of view is changed to a second field of view, control the communication circuit to transmit information indicating the second field of view to the external electronic device,
receive third data of the second quality corresponding to the first field of view and fourth data of the first quality corresponding to the second field of view from the external electronic device, and
control the display device to display the fourth data corresponding to the second field of view,
wherein the instructions are further executable by the processor to receive the first data and the third data through a first communication connection and the second data and the fourth data through a second communication connection, and
wherein the first communication connection has a higher communication quality than the second communication connection.

2. The electronic device of claim 1, further comprising a sensor device including at least one of a gyroscope sensor and an acceleration sensor, wherein the instructions are further executable by the processor to:
transmit to the external electronic device, through the communication circuit, additional information related to the second field of view including at least one of an angle and a speed of a motion of the display device based on sensing information detected through the sensor device.

3. The electronic device of claim 2, wherein the instructions are further executable by the processor to:
receive, from the external electronic device, seventh data of the first quality corresponding to a fifth field of view, the fifth field of view predicted by the external electronic device based on motion information of the display device received by the external electronic device for a predetermined threshold time.

4. The electronic device of claim 1, wherein the instructions are further executable by the processor to:
control the display device to display the third data corresponding to the second field of view when the third data and the fourth data are stored in the memory for a predetermined time after the first data is displayed.

5. The electronic device of claim 1, wherein the first data and the second data are part of a first frame of an omni-directional video, and the third data and the fourth data are included in a second frame of the omni-directional video, and
wherein the instructions are further executable by the processor to control the display device to display at least one of the first frame and the second frame of the omni-directional video according to a predetermined timing signal.

6. The electronic device of claim 2, further comprising an infrared (IR) sensor configured to detect a user's present field of view, wherein the second field of view is detected using the IR sensor.

7. The electronic device of claim 1, wherein the instructions are further executable by the processor to:
receive fifth data of the first quality corresponding to a third field of view from the external electronic device through the communication circuit, and
control the display device to display at least one of information indicating a reception of the fifth data while the fourth data is displayed, and the fifth data corresponding to the third field of view.

8. The electronic device of claim 1, wherein the instructions are further executable by the processor to
when a communication speed of the first communication connection is greater than or equal to a predetermined threshold speed, receive the fourth data through the first communication connection.

9. The electronic device of claim 1, wherein the instructions are further executable by the processor to receive sixth data of the first quality corresponding to a fourth field of view of a user, the sixth data including a predetermined object disposed in the fourth field of view, and
control the display device to display data indicating at least one of:
reception of the sixth data while the fourth data is displayed, and
the sixth data corresponding to the fourth field of view.

10. An electronic device, comprising:
a communication circuit configured to communicate by using a plurality of communication connections;
a memory; and
a processor operatively coupled to the communication circuit and the memory and configured to:
control the communication circuit to transmit first data of a first quality and second data of a second quality different from the first quality through the communication circuit to an external electronic device, the first data corresponding to a first field of view of a user;
receive information related to a second field of view of the user from the external electronic device, and
control the communication circuit to transmit to the external electronic device, third data of the second quality of data corresponding to the first field of view and fourth data of the first quality of data corresponding to the second field of view,
wherein the processor is further configured to control the communication circuit to transmit the first data and the third data through a first communication connection and the second data and the fourth data through a second communication connection, and
wherein the first communication connection has a higher communication quality than the second communication connection.

11. The electronic device of claim 10, wherein the processor is further configured to
when a communication speed of the first communication connection is greater than or equal to a predetermined threshold speed, control the communication circuit to transmit the fourth data through the first communication connection.

12. The electronic device of claim 10, wherein the memory stores per-data captured object information and motion information about a plurality of external electronic devices, wherein the processor is further configured to:
process fifth data or sixth data into the first quality, wherein the fifth data includes predetermined object identification information from among stored data based on the object information and wherein the sixth data corresponds to a third view direction and is transmit to the plurality of external electronic devices a predetermined number of times, and control the communication circuit to transmit the processed fifth data or the processed sixth data through the communication circuit to the plurality of external electronic devices.

13. A method in an electronic device, comprising:
in response to determining that a user's field of view corresponds to a first field of view, receiving from an external electronic device, through a communication circuit which is configured to communicate by using a plurality of communication connections, first data of a first quality, and second data of a second quality which is different from the first quality, wherein the first data corresponds to the first field of view;
displaying the first data and the second data, the first data corresponding to a first field of view of a user;
in response to determining that the user's field of view is changed to a second field of view, transmitting information indicating the second field of view through the communication circuit to the external electronic device;
receiving third data of the second quality corresponding to the first field of view and fourth data of the first quality corresponding to the second field of view from the external electronic device; and
displaying the fourth data corresponding to the second field of view,
wherein the first data and the third data are received through a first communication connection and the second data and the fourth data are received through a second communication connection, and
wherein the first communication connection has a higher communication quality than the second communication connection.

14. The method of claim 13, further comprising transmitting to the external electronic device, through the communication circuit, additional information related to the second field of view including at least one of an angle and a speed of a motion of the electronic device based on sensing information detected through a sensor device.

15. The method of claim 13, further comprising displaying the third data corresponding to the second field of view when the third data and the fourth data are stored in a memory for a predetermined time after the first data is displayed.

16. The method of claim 13, wherein the first data and the second data are part of a first frame of an omni-directional video, and the third data and the fourth data are included in a second frame of the omni-directional video, and
further comprising displaying at least one of the first frame and the second frame of the omni-directional video according to a predetermined timing signal.

17. The method of claim 13, wherein the second field of view of the user is detected using an infrared (IR) sensor of the electronic device.

18. The method of claim 13, further comprising:
receiving fifth data of the first quality corresponding to a third field of view from the external electronic device through the communication circuit, and
displaying at least one of information indicating a reception of the fifth data while the fourth data is displayed, and the fifth data corresponds to the third field of view.

19. The method of claim 13, further comprising:
when a communication speed of the first communication connection is greater than or equal to a predetermined threshold speed, receiving the fourth data through the first communication connection.

* * * * *